(12) United States Patent
Wettels et al.

(10) Patent No.: US 11,162,858 B2
(45) Date of Patent: Nov. 2, 2021

(54) SYSTEMS, DEVICES, AND METHODS FOR SENSING LOCATIONS AND FORCES

(71) Applicant: ONROBOT LOS ANGELES INC., Los Angeles, CA (US)

(72) Inventors: Nicholas Wettels, Los Angeles, CA (US); Keoni Dade, Riverside, CA (US); Menuka Gamage, Canoga Park, CA (US)

(73) Assignee: ONROBOT A/S, Odense SØ (DK)

( * ) Notice: Subject to any disclaimer, the term of this patent is extended or adjusted under 35 U.S.C. 154(b) by 83 days.

(21) Appl. No.: 16/700,024

(22) Filed: Dec. 2, 2019

(65) Prior Publication Data

US 2020/0209085 A1   Jul. 2, 2020

Related U.S. Application Data

(63) Continuation of application No. PCT/US2018/037886, filed on Jun. 15, 2018.

(60) Provisional application No. 62/520,469, filed on Jun. 15, 2017.

(51) Int. Cl.
| | |
|---|---|
| *G01L 5/22* | (2006.01) |
| *B25J 13/08* | (2006.01) |
| *G01L 1/20* | (2006.01) |
| *B25J 15/08* | (2006.01) |

(52) U.S. Cl.
CPC ............. *G01L 5/228* (2013.01); *B25J 13/082* (2013.01); *B25J 13/084* (2013.01); *G01L 1/205* (2013.01); *B25J 15/08* (2013.01)

(58) Field of Classification Search
CPC ........ G01L 5/228; G01L 1/205; B25J 13/082; B25J 13/084; B25J 15/08
See application file for complete search history.

(56) References Cited

U.S. PATENT DOCUMENTS

| | | |
|---|---|---|
| 4,314,230 A | 2/1982 | Cardinal et al. |
| 4,475,008 A | 10/1984 | Doi et al. |
| 5,175,214 A | 12/1992 | Takaya et al. |
| 6,501,984 B1 | 12/2002 | Church et al. |
| 7,481,120 B2 | 1/2009 | Gravesen et al. |

(Continued)

FOREIGN PATENT DOCUMENTS

| | | |
|---|---|---|
| EP | 0855307 A2 | 7/1998 |
| JP | 2000061875 | 2/2000 |

(Continued)

OTHER PUBLICATIONS

"Notice of allowance dated Oct. 12, 2016 for U.S. Appl. No. 14/302,273.".

(Continued)

*Primary Examiner* — Max H Noori
(74) *Attorney, Agent, or Firm* — Wilson Sonsini Goodrich & Rosati

(57) ABSTRACT

Provided are systems, devices, and methods for sensing location and forces. A robotic effector comprising a skin and a core can have a plurality of electrodes integrated in the skin and/or core. Upon interaction with a target object, the robotic effector may determine a total force and/or a location of the force by the target object on the robotic effector. Sensitivity and dynamic range of the robotic effector may improve by changing various configurations.

23 Claims, 18 Drawing Sheets

(56) References Cited

U.S. PATENT DOCUMENTS

| | | | |
|---|---|---|---|
| 7,658,119 | B2 | 2/2010 | Loeb et al. |
| 7,878,075 | B2 | 2/2011 | Johansson et al. |
| 8,102,182 | B2 | 1/2012 | Rabbitt et al. |
| 8,272,278 | B2 | 9/2012 | Loeb et al. |
| 8,750,978 | B2 | 6/2014 | Campbell |
| 8,963,562 | B2 | 2/2015 | Basu et al. |
| 9,089,182 | B2 | 7/2015 | Schrock et al. |
| 9,579,801 | B2 | 2/2017 | Wettels |
| 9,914,212 | B2 | 3/2018 | Wettels |
| 10,155,318 | B2 | 12/2018 | Dadkhah Tehrani et al. |
| 2004/0012570 | A1 | 1/2004 | Cross et al. |
| 2005/0277310 | A1* | 12/2005 | Dibene, II .......... H05K 7/1092 439/66 |
| 2009/0259412 | A1 | 10/2009 | Brogardh |
| 2009/0272201 | A1 | 11/2009 | Loeb et al. |
| 2009/0293631 | A1 | 12/2009 | Radivojevic et al. |
| 2010/0280661 | A1 | 11/2010 | Abdallah et al. |
| 2011/0067504 | A1 | 3/2011 | Koyama et al. |
| 2011/0193363 | A1 | 8/2011 | Nishiwaki |
| 2011/0212661 | A1* | 9/2011 | Lee ...................... G06F 3/0446 445/24 |
| 2013/0116532 | A1 | 5/2013 | Brunner et al. |
| 2013/0172722 | A1* | 7/2013 | Ninane .................. A61B 5/291 600/383 |
| 2013/0207793 | A1* | 8/2013 | Weaber .................... G08B 6/00 340/407.2 |
| 2014/0355387 | A1* | 12/2014 | Kitchens, II ......... H04R 17/005 367/137 |
| 2014/0365009 | A1 | 12/2014 | Wettels et al. |
| 2015/0138452 | A1 | 5/2015 | Petcavich |
| 2016/0274710 | A1 | 9/2016 | Bulea et al. |
| 2017/0052616 | A1* | 2/2017 | Lin ....................... G06F 3/0447 |
| 2019/0262829 | A1* | 8/2019 | Umapathi ......... B01L 3/502715 |

FOREIGN PATENT DOCUMENTS

| | | |
|---|---|---|
| JP | 2010010116 A | 1/2010 |
| KR | 20170040762 A | 4/2017 |
| WO | WO-2008032661 A1 | 3/2008 |
| WO | WO-2011125725 A1 | 10/2011 |
| WO | WO-2014201163 A1 | 12/2014 |
| WO | WO-2018232326 A1 | 12/2018 |

OTHER PUBLICATIONS

"Notice of Allowance dated Nov. 8, 2017 for U.S. Appl. No. 15/400,168".
"Office action dated Jun. 28, 2017 for U.S. Appl. No. 15/400,168".
A. Anderson A. Hilbert, P. Bertrand, S. McFarland, D. Newman, "In-Suit Sensor Systems for Characterizing Human-Space Suit Interaction," presented at the International Conference on Environmental Systems, 2014.
A. Anderson and D. Newman, "Pressure Sensing for In-Suit Measurement of Space Suited Biomechanics," J. Biomech., Submitted in 2014.
A. Anderson, "Understanding Human-Space Suit Interaction to Prevent Injury During Extravehicular Activity," Massachusetts Institute of Technology, Cambridge, MA, 2014.
A. Anderson, D. Newman, and R. Welch, "Statistical Evaluation of Causal Factors Associated with Astronaut Shoulder Injury in Space Suits," J. Aerosp. Med. Hum. Perform. vol. 86, No. 7, 2015.
Anderson et al. Development of the polipo pressure sensing system for dynamic space-suited motion. IEEE Sensors Journal 15(11): 6229-6237 (2015).
Beccai L., et al., "Design and fabrication of a hybrid silicon three-axial force sensor for biomechanical applications", Sensors Actuators A 120, pp. 370-382 2005.
Bertrand et al. Feasibility of spacesuit kinematics and human-suit interactions. International conference on environmental systems: pp. 1-20 (2014) .
Buscher et al. Flexible and stretchable fabric-based tactile sensor. Center of Excellence Cognitive Interaction Technology (CITEC) (2014).
Buscher et al. Flexible and stretchable fabric-based tactile sensor. Robotics and Autonomous Systems 63 (2015) 244-252.
C. R. Reid and S. M. McFarland, "Feasibility Assessment of an Extravehicular Activity Glove Sensing Platform to Evaluate Potential Hand Injury Risk Factors," in 45th International Conference on Environmental Systems, Bellevue, WA, 2015.
Capineri. Resistive sensors with smart textiles for wearable technology: from fabrication processes to integration with electronics. Procedia Engineering 87 (2014) 724-727.
Capua et al. Body Pose Measurement System (BPMS): An Inertial Motion Capture System for Biomechanics Analysis and Robot Control from Within a Pressure Suit. Presented at the International Conference on Environmental Systems. 1-13 (2012).
D. Parry, J. L. Curry, D. Hanson, and G. Towle, "A Study of Techniques and Equipment for the Evaluation of Extravehicular Protective Garments," Hamilton Standard, Dayton, OH, Feb. 1966.
D. Williams and B. J. Johnson, "EMU Shoulder Injury Tiger Team Report," Houston, TX, NASA/TM—2003-212058, 2003.
Extended European search report and opinion dated Jan. 23, 2017 for EP Application No. 14810228.8.
F. Meyen, B. Holschuh, R. Kobrick, S. Jacobs, and D. Newman, "Robotic Joint Torque Testing: A Critical Tool in the Development of Pressure Suit Mobility Elements," presented at the International Conference on Environmental Systems, 2011.
Guo et al. Capacitive wearable tactile sensor basedon smart textile substrate with carbonblack/silicone rubber composite dielectric. Meas. Sci. Technol. 27 (2016) 045105; pp. 1-8.
H. Chang, L. Xue, W. Qin, G. Yuan, and W. Yuan, "An integrated MEMS gyroscope array with higher accuracy output," Sensors, vol. 8, No. 4, pp. 2886-2899, 2008.
Hiroyasu et al. "Method for removing motion artifacts from fNIRS data using ICA and an acceleration sensor," International Conference of the IEEE EMBS.pp. 6800-6803 (2013).
I. Skog, J.-O. Nilsson, P. Handel, and A. Nehorai, "Inertial Sensor Arrays, Maximum Likelihood, and Cramér-Rao Bound," IEEE Trans. Signal Process., vol. 64, No. 16, pp. 4218-4227, Aug. 2016.
Inaba et al. A full-body tactile sensor suit using electrically conductive fabric and strings. Dept. of Mechano-Informatics, The University of Tokyo pp. 450-457 (1996).
International search report and written opinion dated Oct. 16, 2014 for PCT/US2014/041986.
J. M. Waldie and D. J. Newman, "A gravity loading countermeasure skinsuit," Acta Astronaut., vol. 68, No. 7-8, pp. 722-730, Apr. 2011.
J. Matty and L. Aitchison, "A Method for and Issues Associated with the Determination of Space Suit Joint Requirements," presented at the International Conference on Environmental Systems, 2009.
Jacobs et al. "Follow-On Development of the Demonstrator Suit for Post-Shuttle Operations," presented at the International Conference on Environmental Systems, pp. 1-16 (2011).
L. Aitchison, "A Comparison of Methods for Assessing Space Suit Joint Ranges of Motion," presented at the International Conference on Environmental Systems, 2012, p. 12.
NASA, "NASA Space Flight Human System Standard vol. 2: Human Factors, Habitability, and Environmental Health," NASA-STD-3001 vol. II, 2011.
Office action dated Mar. 11, 2016 for U.S. Appl. No. 14/302,273.
Ohmukai M., Kami Y., Matsuura R. "Electrode for Force Sensor of Conductive Rubber" Journal of Sensor Technology, 2, pp. 127-131, 2012.
P. J. Bertrand, "Enhancing Astronaut Mobility Through Spacesuit Kinematics and Interactive Space Outreach," Master's, Massachusetts Institute of Technology, Cambridge, MA, 2016.
P. Schmidt, "An Investigation of Space Suit Mobility with Applications to EVA Operations," Massachusetts Institute of Technology, Cambridge, MA, 2001.
Pan Z., Zhu Z., "Flexible full-body tactile sensor of low cost and minimal output connections for service robot", Industrial Robot: An International Journal, vol. 32 Iss: 6, pp. 485-491, 2005.
PCT/US2018/037886 International Search Report and Written Opinion dated Oct. 18, 2018.

(56) References Cited

OTHER PUBLICATIONS

Peng, F., et al., "Motion artifact removal from photoplethysmographic signals by combining temporally constrained independent component analysis and adaptive filter"BioMedical Engineering OnLine 13:50 (2014).
R. Kobrick, C. Carr, F. Meyen, A. Domingues, and D. Newman, "Using Inertial Measurement Units for Measuring Spacesuit Mobility and Work Envelope Capability for Intravehicular and Extravehicular Activities," presented at the International Astronautical Congress, 2012, p. 9.
Suen et al. A Flexible Multifunctional Tactile Sensor Using interlocked ZnONanorod Arrays for Artificial Electronic Skin. Procedia Engineering 168 (2016) 1044-1047.
Sumer et al. Fabrication of a flexible tactile sensor with micro-pillar array. Procedia Engineering 120 (2015) 134-137.
T. Bhattacharjee, et al. "Tactile sensing over articulated joints with stretchable sensors." World Haptics Conference 2013 pp. 103-108.
U.S. Appl. No. 14/302,273, filed Jun. 11, 2014.
Wettels et al. Polymer-fabric pressure sensor for space suits. International Conference on Environmental Systems, pp. 1-18 (2018).
Wettels, N. "Biomimetic Tactile Sensor for Object Identification and Grip Control," Dissertation at the University of Southern California, 2011.
EP18816563.3 Extended European Search Report dated Jun. 4, 2021.

\* cited by examiner

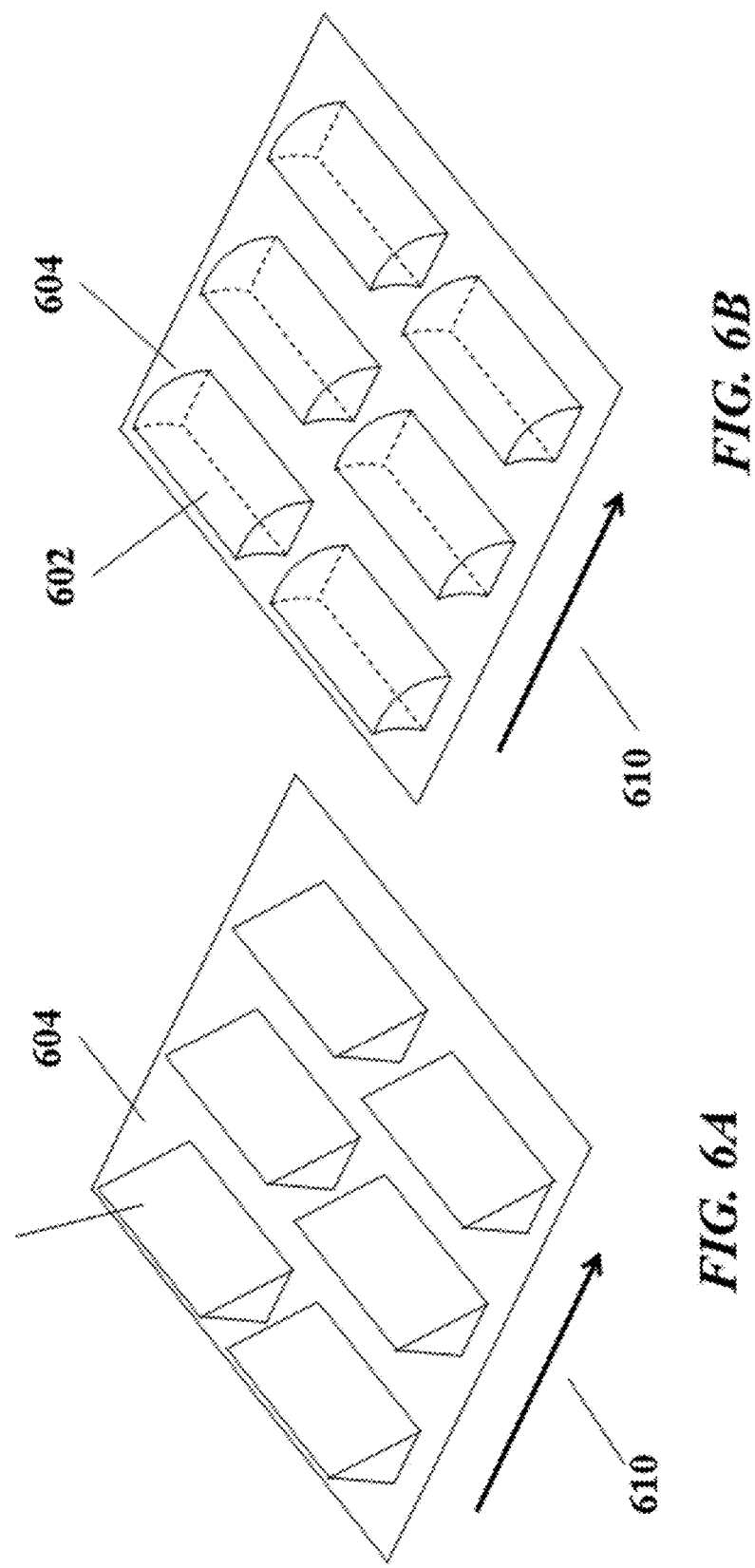

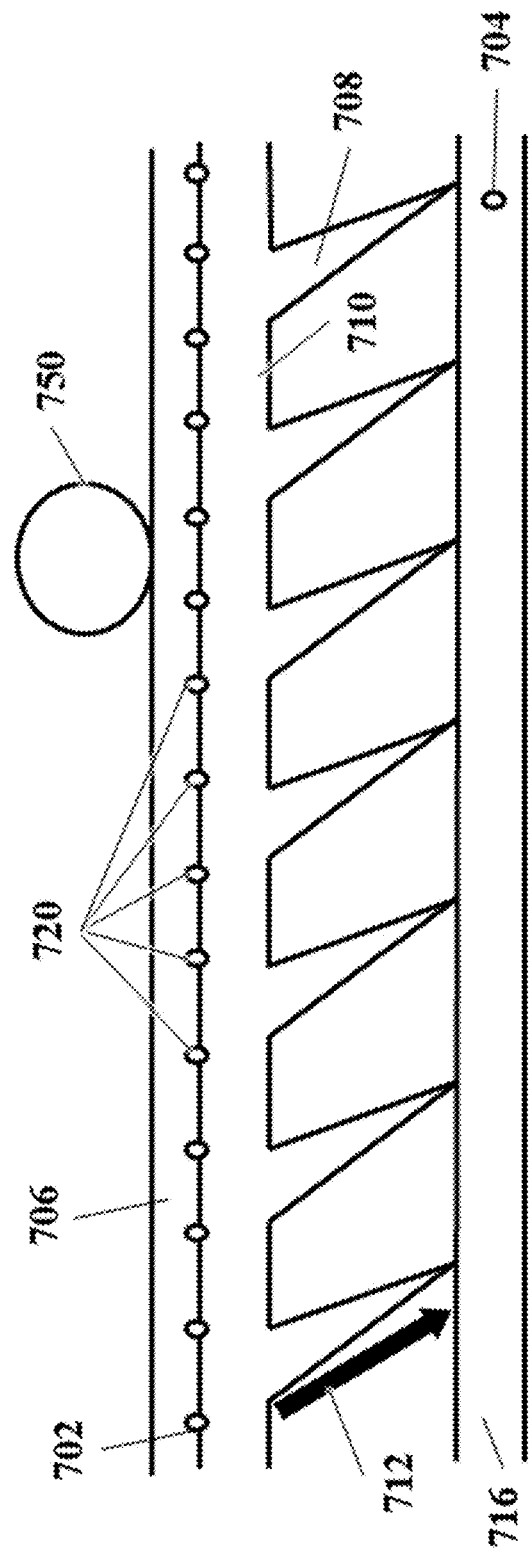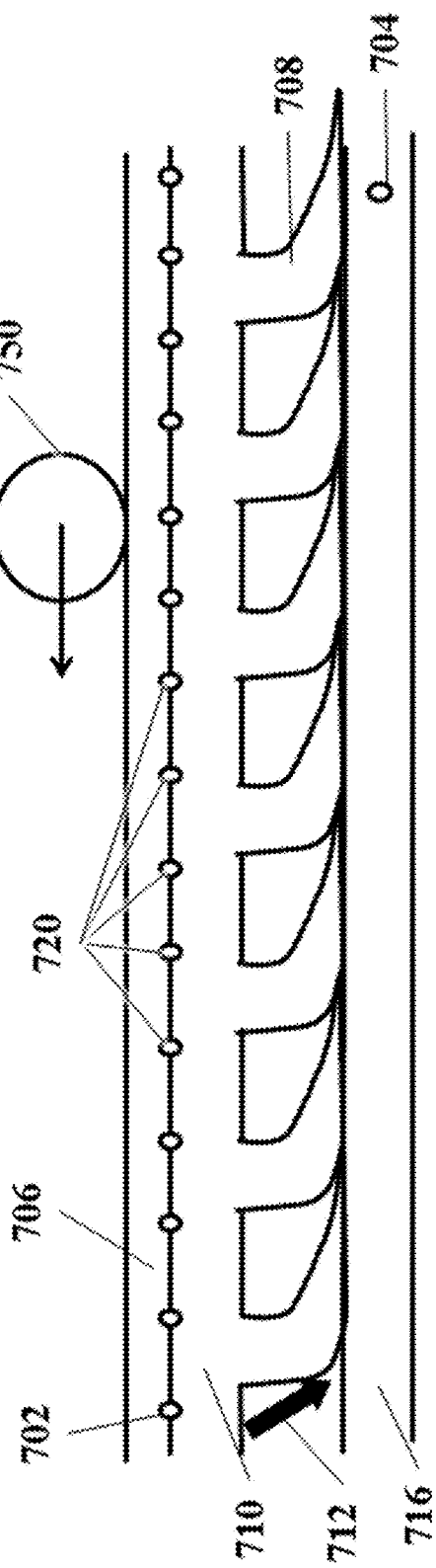
FIG. 7A
FIG. 7B

SYSTEMS, DEVICES, AND METHODS FOR SENSING LOCATIONS AND FORCES

CROSS-REFERENCE

This application is a continuation of International Patent Application No. PCT/US18/37886, filed Jun. 15, 2018, which claims the benefit of U.S. Provisional Patent Application No. 62/520,469, filed Jun. 15, 2017, each of which applications is entirely incorporated herein by reference.

STATEMENT AS TO FEDERALLY SPONSORED RESEARCH

This invention was made with the support of the United States government under Contract number 1555822 awarded by the National Science Foundation (NSF) Small Business Innovation Research (SBIR) program and under Contract number NNX16CP19C awarded by the National Aeronautics and Space Administration (NASA) SBIR program. The United States government has certain rights in the invention.

BACKGROUND

The field of robotics deals with the design, construction, operation, and application of robots, as well as computer systems for their control, sensory, feedback, and information processing. For example, robotics technologies can range from computer vision, high energy-density battery systems, small robust high-performance computation, sophisticated wireless communication links, micro sensors for pressure, magnetism, orientation, and acceleration, and widely available communication devices with displays and multiple sensors for input. These technologies can enable or aid automated machines to perform risky manufacturing processes or operate in risky environments (e.g., outer space) to humans.

Robotic devices, such as biomimetic robots, may emulate humans or other living creatures in appearance, behavior, and/or cognition. In that aspect, robots which are configured to 'pick and place' objects can comprise tactile sensors to emulate human tactile sensing to a certain degree to help monitor, identify, grasp, and manipulate physical objects.

However, modern robots, even biomimetic robots, often lack most of the sensorial capabilities and responses of humans. Human sensory features, such as tactile, touch, and pressure sensing can be difficult to accurately and effectively emulate in machinery. This limitation can prevent industrial robots from performing a wide variety of tasks that involve high precision and sensitivity (e.g., non-factory tasks). The potential utility of robotic technologies can be considered from the perspective of their fundamental properties and implications for sensitivity, dynamic range, and robustness. In some instances, advances in one fundamental property, such as dynamic range of a robot, can adversely affect another property, such as robustness of the robot.

SUMMARY

Sensors, such as visual or tactile sensors, integrated with or acting in conjunction with a robotic end effector can provide only limited information about the robotic end effector's interaction with a physical object or with the environment. Furthermore, to achieve more dynamic range, or to receive more types of information (e.g., proximity, force, location, etc.), the robotic effector can often require significant additional sensory structures and/or complex circuitry. Some sensory structures include piezoresistive, piezoelectric, capacitive, and/or elastoresistive structures. However, addition of such complexity to the robotic end effector is both costly and disadvantageous to its robustness. For example, with more complexity and addition of discrete structures, the robotic effector can become more prone to hardware failure, defect, or damage with corresponding difficulty in repair due to the large number of electrical connections. The physical alterations can also render the robotic end effector incapable of performing the very tasks requiring the more dynamic range or more types of information. Thus, recognized herein is a need for systems and methods for sensing that addresses the aforementioned drawbacks and limitations.

Provided are systems, devices, and methods for sensing locations and forces that can simultaneously disambiguate and discriminate locations and forces with minimal structural complexity while maintaining robustness. The systems, devices, and methods can provide improved dynamic range. Devices and systems provided herein can be used to facilitate automatic machine sensing and manipulation of physical objects. Some embodiments provide conformal elastomeric materials. Some embodiments provide polymeric-fabric or polymeric-textile hybrid materials. In some instances, a sensing system may be integrated as part of an effector. In some instances, a sensing system may be affixed (e.g., as a layer) to an effector. For example, the sensing system may be wrapped around an effector. In some instances, a sensing system may be wearable (e.g., as a garment). For example, the sensing system may be wearable by animate or inanimate objects. The sensing system may be wearable by a human being. For example, the sensing system may be or be part of a garment (e.g., vest, glove, sleeve, etc.).

In an aspect, provided is a system for sensing an object, comprising: an assembly comprising: (1) a first layer comprising a conductive core and a ground electrode, and (2) a second layer adjacent to the first layer, wherein the second layer comprises a polymeric or polymeric-textile substrate, wherein the polymeric or polymeric-textile substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode in the second layer; and a controller electrically coupled to the ground electrode, the power electrode, and the plurality of measurement electrodes, wherein the controller is configured to (i) measure signals indicative of a change in resistance or impedance at the given electrode to determine the location of the given electrode in the second layer, which location corresponds to a point of contact between the object and the assembly, (ii) measure signals indicative of a change in resistance or impedance at an electrically resistive location disposed between the ground electrode and all of the plurality of measurement electrodes to determine a total force or force distribution applied to the assembly, and (iii) generate an output(s) indicative of the point of contact or the total force or force distribution.

In some embodiments, the controller is configured to (i) measure signals indicative of a change in resistance or impedance of the polymeric or polymeric-textile substrate at the given electrode of the plurality of measurement electrodes, and (ii) determine the location, subsequent to physical damage or breach of the polymeric or polymeric-textile substrate.

In some embodiments, the controller is configured to (i) measure signals indicative of a change in resistance or impedance of the polymeric or polymeric-textile substrate at the artificial resistor, and (ii) determine the total force or force distribution, subsequent to physical damage or breach of the polymeric or polymeric-textile substrate.

In some embodiments, the second layer comprises a plurality of layers having different material properties.

In some embodiments, the second layer is wrapped around the first layer. In some embodiments, the first layer and the second layer are concentric.

In some embodiments, the second layer has a plurality of faces. In some embodiments, each face of the plurality of faces of the second layer includes a set of measurement electrodes from the plurality of measurement electrodes. In some embodiments, the controller is configured to measure signals indicative of a change in resistance with a given set of measurement electrodes included in a given face of the plurality of faces to determine a total force or force distribution applied to the given face.

In some embodiments, the first layer and the second layer are permanently fastened. In some embodiments, the first layer and the second layer are temporarily fastened or attached at the periphery.

In some embodiments, the plurality of measurement electrodes is embedded in the polymeric or polymeric-textile substrate.

In some embodiments, a given electrode of the plurality of measurement electrodes is non-metallic. In some embodiments, wherein a given electrode of the plurality of measurement electrodes is flexible.

In some embodiments, the polymeric or polymeric-textile substrate comprises a first component volume and a second component volume, wherein the first component volume has a higher conductivity than the second component volume. In some embodiments, the second component volume comprises a plurality of conductive pathways. In some embodiments, the plurality of conductive pathways are metallic wires or sheets. In some embodiments, the plurality of conductive pathways are conductive polymeric material.

In some embodiments, the controller is configured to, based at least in part on the location and the total force or force distribution, move the conductive core to manipulate the object.

In some embodiments, the controller is part of the assembly.

In some embodiments, the electrically resistive location is a resistor.

In some embodiments, the system comprises a polymeric-textile substrate, wherein the polymeric-textile substrate comprises a plurality of layers. In some embodiments, wherein the assembly is integrated into a garment.

In some embodiments, the assembly is an effector.

In another aspect, provided is a system for sensing shear load from an object, comprising: an assembly comprising: (1) a first layer comprising a conductive core and a ground electrode, and (2) a second layer adjacent to the first layer, wherein the second layer comprises a polymeric or polymeric-textile substrate, wherein the polymeric or polymeric-textile substrate includes (i) a power electrode, (ii) a plurality of measurement electrodes, wherein a given electrode of the plurality of measurement electrodes is configured to sense changes in electrical resistance or impedance of the polymeric or polymeric-textile substrate, and (iii) a plurality of microstructures facing the first layer, wherein a given microstructure of the plurality of microstructures is configured to conform against the first layer upon application of a shear load from the object on the assembly; and a controller electrically coupled to the ground electrode, power electrode, and plurality of measurement electrodes, wherein the controller is configured to measure signals indicative of a change in resistance or impedance at the given electrode to determine a presence of the shear load from the object on the assembly.

In some embodiments, the longitudinal axes of the plurality of microstructures are substantially parallel.

In some embodiments, the plurality of microstructures is symmetric.

In some embodiments, the plurality of microstructures is asymmetrical. In some embodiments, the plurality of microstructures is configured to conform against the first layer upon application of a shear load in a first direction to yield a first contact surface area greater than a second contact surface area that results from application of the shear load in a second direction opposite the first direction.

In some embodiments, the plurality of microstructures is arranged as evenly spaced array in the polymeric or polymeric-textile substrate.

In some embodiments, the controller is programmed to determine a magnitude of the shear load from the object on the assembly.

In some embodiments, the second layer has a first electrical conductivity lower than a second electrical conductivity of the first layer.

In some embodiments, the system comprises a polymeric-textile substrate, wherein the polymeric-textile substrate comprises a plurality of layers. In some embodiments, wherein the assembly is integrated into a garment.

In some embodiments, the assembly is an effector.

In another aspect, provided is a system for sensing an object, comprising: an assembly comprising: (1) a first layer comprising a conductive rigid core and a ground electrode, (2) a second layer, wherein the second layer comprises a polymeric or polymeric-textile substrate, wherein the polymeric or polymeric-textile substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode, and (3) an intermediary band, comprising a cavity, that is disposed between the first layer and the second layer such that the first layer and the second layer is (i) electrically isolated when the assembly is in a resting state, and (ii) in electrical communication by contacting through the cavity when the assembly is in a stressed state receiving the forces from the object; and a controller electrically coupled to the ground electrode, power electrode, and plurality of measurement electrodes, wherein the controller is configured to measure signals indicative of a change in resistance or impedance at the given electrode to determine the location of the given electrode, which location corresponds to a point of contact between the object and the assembly, or a total force or force distribution applied to the assembly.

In some embodiments, the intermediary band has a first electrical conductivity lower than a second electrical conductivity of the second layer.

In some embodiments, the controller is programmed to determine the location of the given electrode and the total force or force distribution applied to the assembly.

In some embodiments, the intermediary band comprises a plurality of cavities, and is disposed between the first layer and the second layer such that the first layer and the second layer is (i) electrically isolated when the assembly is in the resting state, and (ii) in electrical communication by contacting through the plurality of cavities when the assembly is in the stressed state.

In some embodiments, the power electrode is configured as a mesh.

In some embodiments, the plurality of measurement electrodes are configured as a mesh.

In some embodiments, the intermediary band is flexible.

In some embodiments, the intermediary band is planar.

In another aspect, provided is a system for sensing an object, comprising: an assembly comprising: (1) a first layer comprising a conductive rigid core and a ground electrode, wherein a surface of the first layer is convex at a first curvature, (2) a second layer, wherein the second layer comprises a polymeric or polymeric-textile substrate, wherein the polymeric or polymeric-textile substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode in the second layer, wherein a surface of the second layer interfacing with the first layer is at a second curvature, wherein the first curvature and the second curvature are different, and (3) an intermediary base fastened to the first layer via a first fastening mechanism and fastened to the second layer via a second fastening mechanism, wherein the first layer and the second layer are (i) electrically isolated by a gap when the assembly is in a resting state, and (ii) in electrical communication by contacting through the gap when the assembly is in a stressed state receiving a force from the object; and a controller electrically coupled to the ground electrode, power electrode, and plurality of measurement electrodes, wherein the controller is configured to measure signals indicative of a change in resistance or impedance at the given electrode to determine the location of the given electrode or a total force or force distribution applied to the assembly.

In some embodiments, the intermediary base has a first electrical conductivity lower than a second electrical conductivity of the second layer.

In some embodiments, the controller is configured to determine the location of the given electrode and the total force or force distribution applied to the assembly.

In another aspect, provided is a sensor assembly for sensing a force from an object, comprising: an assembly comprising: (1) a first layer comprising a first set of electrodes embedded therein, wherein a given electrode in the first set of electrodes is configured to apply a voltage or current to the sensor assembly in rotation, (2) a second layer adjacent to the first layer, wherein the second layer comprises a second set of electrodes embedded therein, wherein each electrode in the second set of electrodes is configured to sense changes in electrical resistance or impedance of the second layer at or adjacent to a location of the each electrode in the second layer, and (3) a third layer adjacent to the first layer or the second layer coupled to a ground electrode; and a controller electrically coupled to the ground electrode, the first set of electrodes, and the second set of electrodes, wherein the controller is configured to for each given electrode in the first set of electrodes, (i) apply the voltage or current to the sensor assembly through the given electrode, and (ii) measure signals indicative of a change in resistance or impedance at each electrode of the second set of electrodes to determine a location of the force applied by the object.

In some embodiments, the third layer is adjacent to a first surface of the second layer, wherein the first surface is substantially opposite a second surface adjacent to the first layer. In some embodiments, the first surface is above the second surface. In some embodiments, the first surface is below the second surface.

In some embodiments, the first layer, second layer, or third layer comprises a polymeric or polymeric-textile substrate.

In another aspect, provided is a method for sensing an object, comprising: (a) activating an assembly comprising (1) a first layer comprising a conductive core and a ground electrode, and (2) a second layer adjacent to the first layer, wherein the second layer comprises a polymeric or polymeric-textile substrate, wherein the polymeric substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode in the second layer; (b) measuring signals indicative of a change in resistance or impedance at the given electrode to determine the location of the given electrode in the second layer, which location corresponds to a point of contact between the object and the assembly; (c) measuring signals indicative of a change in resistance or impedance at an electrically resistive location disposed between the ground electrode and all of the plurality of measurement electrodes to determine a total force or force distribution applied to the assembly; and (d) generating an output(s) indicative of the point of contact or the total force or force distribution.

In some embodiments, the second layer has a plurality of faces. In some embodiments, the method further comprises measuring signals indicative of a change in resistance or impedance with a first set of measurement electrodes included in a first face of the plurality of faces to determine a total force or force distribution applied to the first face.

In some embodiments, the point of contact and the total force are registered together in rapid succession.

In another aspect, provided is a method for sensing shear load from an object, comprising: (a) activating an assembly comprising: (1) a first layer comprising a conductive core and a ground electrode, and (2) a second layer adjacent to the first layer, wherein the second layer comprises a polymeric or polymeric-textile substrate, wherein the polymeric or polymeric-textile substrate includes (i) a power electrode, (ii) a plurality of measurement electrodes, wherein a given electrode of the plurality of measurement electrodes is configured to sense changes in electrical resistance or impedance of the polymeric or polymeric-textile substrate, and (iii) a plurality of microstructures facing the first layer, wherein a given microstructure of the plurality of microstructures is configured to conform against the first layer upon application of a shear load from the object on the assembly; (b) measuring signals indicative of a change in resistance or impedance at the given electrode; and (c) based at least in part on the signals, determining a presence of the shear load from the object on the assembly.

In some embodiments, the plurality of microstructures is symmetric.

In some embodiments, the plurality of microstructures is asymmetrical.

In some embodiments, the method further comprises based at least in part on the signals, determining a magnitude of the shear load from the object on the assembly.

In some embodiments, the second layer has a first electrical conductivity lower than a second electrical conductivity of the first layer.

In another aspect, provided is a method for sensing an object, comprising: (a) activating an assembly comprising (1) a first layer comprising a conductive rigid core and a ground electrode, (2) a second layer, wherein the second layer comprises a polymeric or polymeric-textile substrate, wherein the polymeric or polymeric-textile substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode, and (3) an intermediary band, comprising a cavity, that is disposed between the first layer and the second layer such that the first layer and the second layer is (i) electrically isolated when the assembly is in a resting state, and (ii) in electrical communication by contacting through the cavity when the assembly is in a stressed state receiving the forces from the object; (b) measuring signals indicative of a change in resistance or impedance at the given electrode; and (c) based at least in part on the signals, determining the location of the given electrode in the second layer, which location corresponds to a point of contact between the object and the assembly, or a total force or force distribution applied to the assembly.

In some embodiments, the intermediary band has a first electrical conductivity lower than a second electrical conductivity of the second layer.

In some embodiments, the method further comprises determining the location of the given electrode and the total force or force distribution applied to the assembly.

In some embodiments, the intermediary band comprises a plurality of cavities, and is disposed between the first layer and the second layer such that the first layer and the second layer is (i) electrically isolated when the assembly is in the resting state, and (ii) in electrical communication by contacting through the plurality of cavities when the assembly is in the stressed state.

In some embodiments, the power electrode is configured as a mesh.

In some embodiments, the plurality of measurement electrodes are configured as a mesh.

In some embodiments, the intermediary band is flexible.

In some embodiments, the intermediary band is planar.

In another aspect, provided is a method for sensing an object, comprising: (a) activating an assembly comprising (1) a first layer comprising a conductive rigid core and a ground electrode, wherein a surface of the first layer is convex at a first curvature, (2) a second layer, wherein the second layer comprises a polymeric or polymeric-textile substrate, wherein the polymeric or polymeric-textile substrate includes a power electrode and a plurality of measurement electrodes, and wherein a given electrode of the plurality of measurement electrodes is configured to sense changes in electrical resistance or impedance of the polymeric or polymeric-textile substrate at or adjacent to a location of the given electrode in the second layer, wherein a surface of the second layer interfacing with the first layer is at a second curvature, wherein the first curvature and the second curvature are different; and (3) an intermediary base fastened to the first layer via a first fastening mechanism and fastened to the second layer via a second fastening mechanism, wherein the first layer and the second layer are (i) electrically isolated by a gap when the assembly is in a resting state, and (ii) in electrical communication by contacting through the gap when the assembly is in a stressed state receiving a force from the object; (b) measuring signals indicative of a change in resistance or impedance at the given electrode; and (c) based at least in part on the signals, determining the location of the given electrode, which location corresponds to a point of contact between the object and the assembly, or a total force or force distribution applied to the assembly.

In some embodiments, the intermediary base has a first electrical conductivity lower than a second electrical conductivity of the second layer.

In some embodiments, the method further comprises determining the location of the given electrode and the total force or force distribution applied to the assembly.

In another aspect, provided is a method for sensing a force from an object, comprising: (a) activating an assembly comprising (1) a first layer comprising a first set of electrodes embedded therein, wherein a given electrode in the first set of electrodes is configured to apply a voltage or current to the sensor assembly in rotation, (2) a second layer adjacent to the first layer, wherein the second layer comprises a second set of electrodes embedded therein, wherein each electrode in the second set of electrodes is configured to sense changes in electrical resistance or impedance of second layer at or adjacent to a location of the each electrode in the second layer; and (3) a third layer adjacent to the first layer or the second layer coupled to a ground electrode; (b) applying the voltage or current to the assembly, through the given electrode in the first set of electrodes in rotation; (c) measuring signals indicative of a change in resistance or impedance at each electrode of the second set of electrodes during each the rotation; and (d) based at least in part on the signals, determining a location of the force applied by the object, which location corresponds to a point of contact between the object and the assembly.

In some embodiments, the third layer is adjacent to a first surface of the second layer, wherein the first surface is substantially opposite a second surface adjacent to the first layer. In some embodiments, the first surface is above the second surface. In some embodiments, the first surface is below the second surface.

In some embodiments, the first layer, second layer, or third layer comprises a polymeric or polymeric-textile substrate.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein) of which:

FIG. 6A illustrates a perspective view of exemplary microstructures in a sensing system in an unengaged state.

FIG. 6B illustrates a perspective view of exemplary microstructures in a sensing system in an engaged state.

FIG. 7A shows a cross-sectional side view of a plurality of microstructure stalks in an unengaged state.

FIG. 7B shows a cross-sectional side view of the plurality of microstructure stalks in an engaged state.

DETAILED DESCRIPTION

Figure 1:
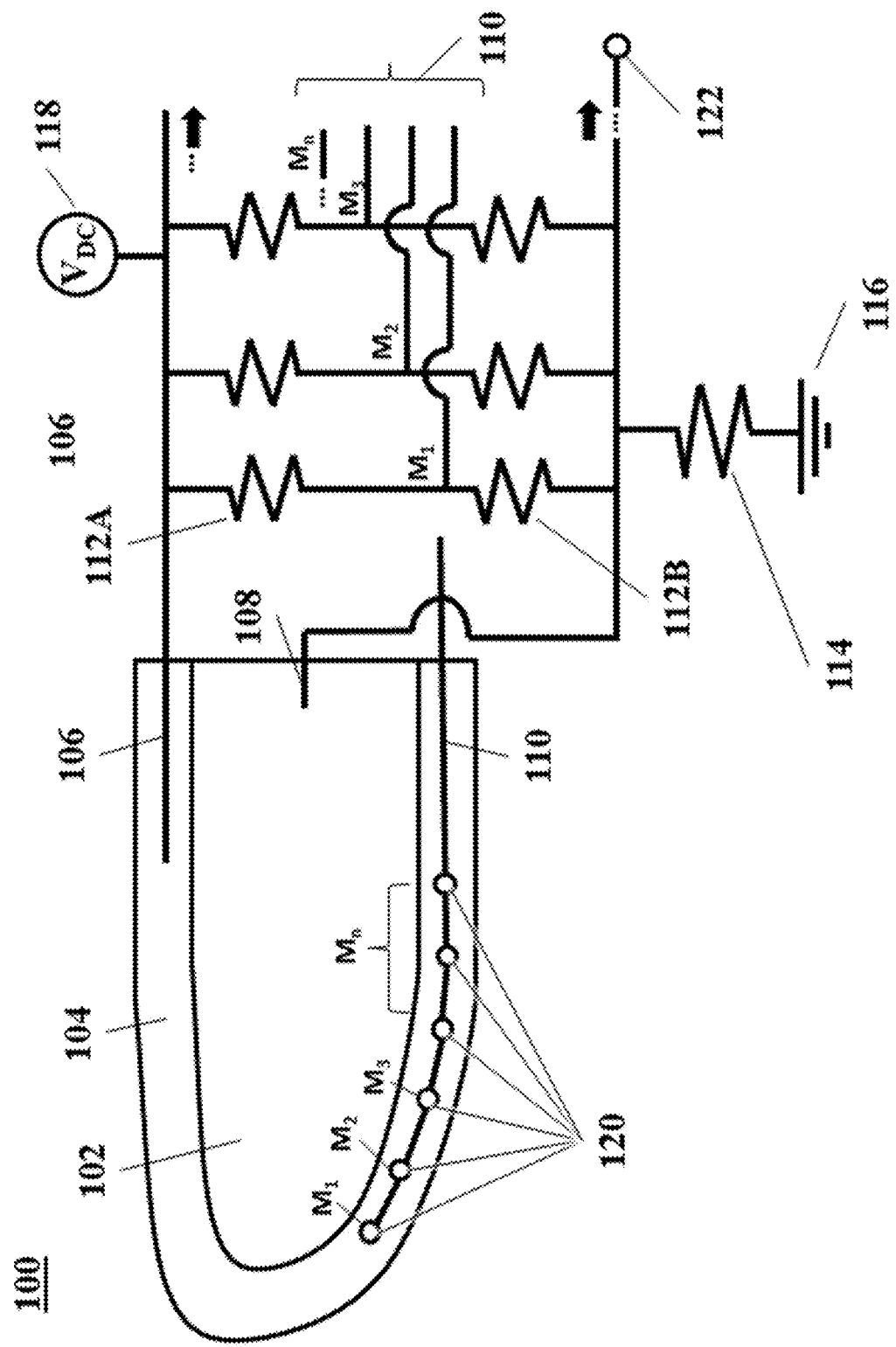
FIG. 1 shows a cross-sectional view of a robotic end effector and a schematic diagram of the electrical system for disambiguation of locations and forces.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "elastomer," as used herein, refers to a material that changes properties in response to an applied force. Elastomers, in various formulations, can respond and/or react to normal forces, compression, torque, or sheer stresses or forces. Some elastomers are also referred to as "rubber," "polymer," or "silicone." Typically, but not always, an elastomer can respond to an applied force with a physical deformation. Additionally, elastomers can be designed to change various properties such as impedance or resistance in response to applied force, stress, or torque. Elastomers can be configured to change properties when stressed in one dimension, or in multiple dimensions (e.g., two dimensions, three dimensions, etc.). Such changing properties can be quantified, for example by one or more sensors, to determine a presence or magnitude of stress. Elastomers can be formulated and produced with various properties that may be desirable for a given application, for example desired flexibility, stiffness (i.e. spring constant or dimensional change in response to pressure), conformability (i.e. ability to follow a curved or complex contour), thickness, color, or electrical or heat conductivity. Another property of an elastomer is "durometer," which is its hardness or resistance to permanent deformation. Some example elastomeric material include, but are not limited to, silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, urethane rubber and the like.

The present disclosure provides end effectors, including robotic end effectors, and wearable devices. An end effector or a wearable device can comprise or be coupled to one or more sensing systems to provide information about an interaction with a physical object or with the environment. Beneficially, provided are systems, methods, and devices for sensing locations and forces that can simultaneously disambiguate and discriminate locations and forces from a singular measurement configuration with minimal structural complexity while maintaining robustness. Such sensing systems can provide improved dynamic range, more types of information (e.g., proximity, force, location, etc.) and/or higher resolution. Devices and systems provided herein can be used to facilitate automatic machine sensing and manipulation of physical objects. Some embodiments provide conformal elastomeric materials. Some embodiments provide textile or other fiber materials. Some embodiments provide polymeric-fabric or polymeric-textile hybrid materials (or other polymeric blends).

In some aspects, provided are integrated sensing systems. A robotic end effector may comprise the integrated sensing system. For example, the robotic end effector, in part or in whole, may constitute a part of the integrated sensing system (e.g., a metal finger can be the inner layer of an integrated sensing system). A wearable device may comprise the integrated sensing system. For example, a garment (e.g., vest, glove, sleeve, etc.), in part or in whole, may constitute a part of the integrated sensing system. In other aspects, provided are standalone sensing systems that may be coupled to, or otherwise perform in conjunction with, an end effector. A standalone sensing system may be coupled to, or otherwise perform in conjunction with, a wearable device (or other wearable object). In some instances, a sensing system may be wearable by animate or inanimate objects. The sensing system may be wearable by a human being, for example as clothing or an undergarment (e.g., underneath a suit such as a spacesuit).

Reference is now made to the Figures. The Figures are not necessarily drawn to scale.

FIG. 1 shows a cross-sectional view of a robotic end effector and a schematic diagram of the electrical system for disambiguation of locations and forces. A robotic end effector 100 can comprise two parts, a core 102 (inner layer) and a skin 104 (outer layer). The skin 104 can surround the core 102, entirely or in part. The core 102 can have a higher electrical conductivity, or lower resistance or impedance, than the skin 104. The robotic end effector 100 may comprise an embedded flex circuit. A sensing control system (not shown) communicatively coupled to the robotic end effector 100 may be able to determine both total force applied by a physical object to the robotic end effector 100 as well as location of a force applied by the physical object (and/or contact location or point between the object and the robotic end effector).

The robotic end effector 100 can be any part of a robot configured to perform an external action, such as picking and/or placing a physical object. The robotic end effector 100 can be any part of a robot configured to interface or otherwise interact with an external physical object, such as involving contact or near-contact with a physical object. The robotic end effector 100 can be any part of a robot configured to respond to an interaction with a physical object, such as involving sensing a physical object to move towards or away from the physical object. A "physical object," as used herein, can refer to any tangible physical object or any part or surface of a tangible physical object. The physical object can have smaller or larger dimensions than the robotic end effector 100. A robot may comprise one or more robotic end effectors. For example, one or more robotic end effectors can individually or collectively act in conjunction to perform one or more actions (e.g., picking up an object, placing down an object, etc.). In some instances, the robotic end effector 100 can be a manipulation member and/or magnetic actuator. The robotic end effector 100 can be a biomimetic fingertip.

The robotic end effector 100 may have various form factors. The robotic effector 100 may be in the shape of a finger, fingertip, hand, foot, member, rod, trunk (e.g., elephant trunk), mouth, jaw, wing, or other form factors.

The core 102 can be substantially rigid. The core 102 can be semi-rigid. The core 102 can be capable of maintaining structural rigidity upon receipt of external force. The core 102 can comprise a conductive material, such as a metal. The core 102 can be a non-conductive material with a conductive coating. In some instances, the core 102 can be a robotic surface and/or an extension of a robotic body, such as a robotic fingertip.

The skin 104 can comprise a substantially flexible and/or stretchy material. The skin 104 can be conductive. For example, the skin 104 can comprise a polymeric conductive elastomer (e.g., rubber). The skin can be formed of a polymeric material, such as polysiloxane (silicone rubber), polyurethane or other elastomeric compounds. The polymeric material can include a thermoplastic or thermoset, for example. In some instances, the skin can further include doping agents and/or foaming agents to vary mechanical (e.g., rigidity), thermal (e.g., conductivity), and/or electrical (e.g., conductivity) properties of the material. For example, the elastomeric skin can comprise foam and/or carbon black.

In some instances, the skin 104 may comprise textile material. The textile material may comprise natural or synthetic fibers and/or micro- or nano-fibers. For example, the textile may comprise or otherwise be derived from sources such as animals (e.g., wool, fur, silk, etc.), plants (e.g., cotton, flax, jute, hemp, other bast fiber, etc.), minerals (e.g., glass fiber, metal fiber, metal foil, metal wires, asbestos, basalt fiber, etc.), and synthetic materials (e.g., polyester, acrylic, nylon, olefin, aramid, carbon fiber, other artificial fabrics, etc.). In some instances, the skin 104 can comprise a polymeric blend, such as polymeric-fabric or polymeric-textile hybrid materials.

As described elsewhere herein, the skin 104 may comprise one or more layers. The layers may comprise conductive materials and/or non-conductive materials. The layers may be arranged in any configuration. For example, in some configurations, the layers may be arranged in alternating conductive and non-conductive layers. Alternatively, the layers may be arranged in other configurations (e.g., grid, weave, conductive layers in a set adjacent to non-conductive layers in another set, etc.). One or more layers may be, for example, configured as conductive rubber sheets, knits, weaves, and/or other textile configurations. Some examples of textile configurations in sensors are described in G. Büscher et al., *Flexible and stretchable fabric-based tactile sensor*, 63(3) ROBOTICS AND AUTONOMOUS SYSTEMS 244-52 (January 2015); Zengxi Pan et al., *Flexible full-body tactile sensor of low cost and minimal output connections for service robot*, 32(6) INDUSTRIAL ROBOT: AN INTERNATIONAL JOURNAL 485-91 (2005); M. Inaba et al., *A Full-Body Tactile Sensor Suit Using Electrically Conductive Fabric and Strings*, Proc. IROS (1996); T. Bhattacharjee et al., *Tactile sensing over articulated joints with stretchable sensors*, PROC. WORLD HAPTICS CONFERENCE, pp. 103-08 (2013); and L. Capineri, *Resistive sensors with smart textiles for wearable technology: from fabrication processes to integration with electronics*, EUROSENSORS 2014, 87 PROCEDIA ENGINEERING 724-27 (2014), which are each entirely incorporated herein by reference.

Beneficially, the present disclosure not only provides for the integration of an electronics structure and measurement scheme to polymeric or polymeric-textile material (e.g., the skin 104), but also consolidates discrete sensing elements into a single sensing grid (or a plurality of coordinated sensing grids) to process sensing data, such as to resolve location and execute interpretive algorithms to generate a pressure map. The sensing systems described herein may be sensitive to different types of applied forces, such as to distinguish between shear stress and normal forces. The polymeric or polymeric-textile hybrid sensing systems, having integrated electronics and measurement schemes, of the present disclosure may provide several advantages, such as increased pressure range (e.g., sensitivity), increased particularity, increased repeatability, increased accuracy, reduced hysteresis, variable sensor thickness, low cost, increased dynamic range, increased modularity (and scalability), increased flexibility (and elasticity), increased robustness, and/or a combination thereof.

The skin 104 can change various properties, such as impedance or resistance, in response to an applied force, such as an applied normal force, compression, torque, or shear stress or force. In some instances, the skin 104 can respond with a physical deformation. The skin 104 can be configured to change properties when stressed in one dimension, or in multiple dimensions (e.g., two dimensions, three dimensions, etc.). Such changing properties can be quantified, for example by one or more sensors, to determine a presence, magnitude, and/or location of an applied force or stress. A sensor can be one or more electrodes transmitting signals indicative of electrical properties, such as voltage, current, resistance, and/or impedance.

The skin 104 can be adjacent to the core 102 and surround the core 102, entirely or in part. The skin 104 can be fastened to the core 102, such as via complementary fastening features. For example, the skin 104 and the core 102 can complete a form-fitting pair, in which the skin 104 can glove the core 102. In some instances, an outer diameter of the core 102 can be substantially equal to an inner diameter of the skin 104, such that core 102 can be securely inserted into the skin 104 in a form-fitting manner. In some instances, an outer diameter the core 102 can be substantially equal or larger than an inner diameter of the skin 104, such that the skin 104 is stretched or otherwise deformed to fit the core 102 in a form-fitting manner. Alternatively or in addition, the skin 104 and the core 102 can each or together comprise other types of complementary structures (e.g., hook and loop, latches, snap-ons, buttons, nuts and bolts, internal and external threads, complementary grooves, etc.) that can be fastened together. Alternatively or in addition, the two components can be fastened using other fastening mechanisms, such as but not limited to adhesives (e.g., glue), staples, clips, clamps, prongs, rings, brads, rubber bands, rivets, grommets, pins, ties, snaps, velcro, tapes, knots, a combination thereof, or any other types of fastening mechanisms. When fastened, the skin 104 can be fixed relative to the core 102. In other instances, the skin 104 may have some flexibility to move relative to the core 102, such as to slide or rotate about or against at least a surface of the core 102.

The fastening can be temporary, such as to allow for subsequent unfastening of the skin 104 from the core 102 without damage (e.g., permanent deformation, disfigurement, etc.) to both the skin 104 and the core 102 or with minimal damage (e.g., slight stretching of the skin 104). The fastening can be permanent, such as to allow for subsequent unfastening of the skin 104 from the core 102 only by damaging at least one of the skin 104 and the core 102. The skin 104 can be temporarily or permanently deformed (e.g., stretched, compressed, etc.) and/or disfigured (e.g., bent, wrinkled, folded, creased, etc.) or otherwise manipulated when fastened or during fastening to the core 102. The core 102 can be temporarily or permanently deformed (e.g., stretched, compressed, etc.) and/or disfigured or otherwise manipulated when fastened or during fastening to the skin 104 (e.g., from an equilibrium state of the elastomeric material of the skin). In some instances, one or both of the skin 104 and the core 102 can be cut into or pierced by the other when the two are fastened together. When fastening is temporary, beneficially, the skin 104 and/or the core 102 can be replaced, cleaned, repaired, and/or recycled without having to discard other functioning components.

In some instances, the core 102 and the skin 104 can be fastened with one or more electrodes and/or wiring thereof positioned and/or fastened between the core 102 and the skin 104. An electrode can be any conductive pathway, such as from a first reference point to a second reference point. For example, an electrode can be a conductive wire or sheet. An electrode can be flexible. An electrode can be metallic or non-metallic. For example, an electrode can be formed of a polymeric material with higher electrical conductivity than the adjacent material or environment in which the electrode lies or contacts. An electrode can be formed of a carbon-containing material, such as carbon powder or carbon nanostructures. In some instances, an electrode can be housed in, or adjacent to, an insulating material. An electrode can be a sensing channel.

An electrode can be embedded or integrated into the skin 104. In some instances, the skin 104 can comprise different component volumes with different conductivities to achieve this. Component volumes with high conductivity can act as conductive pathways and/or conductive threads, which can be analogous to electrodes and/or wiring thereof. For example, an elastomeric skin can comprise a high conductivity polymeric material for some component volumes and a low conductivity material for some component volumes. In some instances, a high conductivity polymeric material (e.g., elastomer) can have a resistivity from about 0.0001 Ohm-cm and 100 Ohm-cm, or about 0.001 Ohm-cm and 10 Ohm-cm. A low-conductivity polymeric material can have a resistivity from about 10 Ohm-cm and 100 kOhm-cm, or about 100 Ohm-cm and 10 kOhm-cm. Advantageously, via the conductive pathways (or tunnels) and/or conductive threads formed through the skin 104, electrical contact points which are vulnerable to damage can be shielded from external stress. Examples of forming conductive pathways and different component volumes are provided in U.S. Pat. No. 9,579,801, which is entirely incorporated herein by reference. Such conductive pathways and/or conductive threads can be integrated into the skin 104 via methods such as molding and/or three dimensional (3D) printing. In some instances, different layers of the skin 104 may have different conductivities. A layer may have different conductivities (e.g., within different regions). A layer may have one or more embedded electrodes. A layer may not have any electrodes.

The robotic end effector 100 may achieve simultaneous sensing of locations of forces and a total force applied by a physical object via a singular measurement configuration. The measurement configuration can comprise a plurality of electrical components that can be preassembled via a flex circuit. The flex circuit can be embedded or otherwise integrated in the robotic end effector 100.

A ground electrode 108 can be coupled to the core 102. In some instances, the ground electrode 108 can be attached or fastened to an outer surface of the core 102. In some instances, the ground electrode 108 can be embedded or integrated in the core 102 material. The ground electrode can be in electrical connection with any other object to achieve grounding. A power electrode 106, electrically coupled to a power source 118, can be coupled to the skin 106. In some instances, the power electrode 106 can be embedded or integrated in the skin 104. For example, the power electrode 106 can be routed into the polymeric material of the skin 104 as a conductive pathway and/or high conductivity component volume. In some instances, the power electrode 106 can be attached or fastened to an outer surface of the skin 104. The power electrode 106 can be configured to apply a current or voltage to the skin 104.

One or more measurement electrodes 110, each represented by a sensing channel 120, can be further coupled to the skin 104. The one or more measurement electrodes 110 can each be embedded or otherwise integrated in the skin 104. For example, each measurement electrode can be routed into the polymeric material of the skin 104 as independent conductive pathways and/or high conductivity component volumes. The conductive pathway can have a higher conductivity (or lower resistance or impedance) than the surrounding, or adjacent, material of the skin 104. A given electrode of the one or more measurement electrodes 110 can have a sensing channel 120 at a distinct location on the skin 104. For example, the skin 104 can have a first measurement electrode with a first sensing channel $M_1$ at a first location, a second measurement electrode with a second sensing channel $M_2$ at a second location, a third measurement electrode with a third sensing channel $M_3$ at a third location, and an $n^{th}$ measurement electrode with an $n^{th}$ sensing channel $M_n$ at an $n^{th}$ location.

A sensing control system (not shown in FIG. 1) can be configured to control and receive signals (e.g., data) from each of the one or more measurement electrodes 110 at the corresponding sensing channel. The signals can be indicative of electrical properties (e.g., resistance, impedance, etc.) at the corresponding sensing channel. In some instances, the sensing control system can be one or more of a controller, a microcontroller, processor, and/or microprocessor. Each electrode can be electrically coupled to the sensing control system. The sensing control system can comprise flex circuitry or other circuitry configured to implement the methods described herein. For example, in some instances, one or more multiplexers (MUX) (e.g., 16 channel MUX) in communication with the sensing control system can be used to control signals to and from each of the electrodes. The sensing control system can provide instructions to a multiplexer to select each electrode for connection to the measurement circuitry. A printed circuit board (PCB) can be used to filter and split the data signal into raw and differentiated voltage. In some instances, voltage measurements can be extracted using a voltage divider.

While FIG. 1 shows six measurement electrodes, the skin 104 can have more than six or fewer than six measurement electrodes, such as depending on the desired resolution of sensing. The skin 104 can have, for example, at least about 1, 2, 3, 4, 5, 6, 7, 8, 9, 10, 11, 12, 13, 14, 15, 16, 17, 18, 19, 20, 30, 40, 50, 100 or more measurement electrodes, each having a sensing channel at a distinct location on the skin 104. In some instances, each of the sensing channels 120 may be positioned on the skin 104 in an evenly-spaced array or a grid-like pattern. For example, a mesh of electrodes can be embedded in the skin 104. In other instances, each of the sensing channels 120 may be laid out in an arbitrary pattern with non-uniform spacing between each channel. The plurality of measurement electrodes can be arranged in any two-dimensional (2D) or three-dimensional (3D) pattern. In some instances, each of the sensing channels 120 may be positioned on one or more key reference locations.

When a physical object applies a force on any part of the skin 104 of the robotic end effector 100, such as a normal force, compression, torque, shear stress, or shear force, at least a part of the skin 104 can change properties in response to the applied force, such as impedance or resistance of the skin 104. Such changes in impedance or resistance properties can be quantified and monitored by the electrodes coupled to the robotic end effector 100. For example, a change in voltage measurement can be indicative of a change in resistance, and the change in resistance can be indicative of a presence of a force applied on the skin 104. The plurality of electrodes coupled to the robotic end effector 100 can each transmit signals that can be used to determine both location of the applied force, as well as a total magnitude of the force applied across the robotic end effector 100.

Location can be determined by applying a current, such as by the power source 118, via the power electrode 106 to the skin 104 and monitoring changes in voltage measured at the different sensing channels 120, for example, with reference to the ground electrode 108. A voltage measurement at a given sensing channel can (i) correspond to the location of the given sensing channel in the skin 104 and (ii) be indicative of a resistance or impedance of the skin 104 (e.g., polymeric material) between the power source 118 and the measurement electrode at the given sensing channel and/or between the measurement electrode at the given sensing channel and the ground 116. When a force is applied to the skin 104, the skin 104 may change electrical properties which can be monitored by changes in voltage measurements. Different parts of the skin 104 can experience different magnitudes of change in electrical properties in response to the same application of force.

Thus, changes in voltage measurements at a particular sensing channel may be indicative of the presence of a force being applied (and presence of an object applying such force) to the skin 104 at or relative to the location of the particular sensing channel. Data (e.g., voltage measurements) received from other sensing channels can be combined, for example by the sensing control system, to determine a pressure or stress map across the skin 104 to estimate the location of an object applying force on the skin 104 and/or the shape of the object. The sensing control system can determine an in-hand pose estimation of the object relative to the robotic end effector 100.

In an example, referring to the schematic electric configuration in FIG. 1, a voltage is measured at the first sensing channel $M_1$ positioned at a first location on the skin 104, and any changes in the voltage measured at $M_1$ is monitored. A change in a first resistance 112A and/or a change in a second resistance 112B can change the voltage measured at $M_1$. The first resistance 112A can be indicative of a resistance between the power electrode 106 and the first measurement electrode through the polymer material of the skin 104, and the second resistance 112B can be indicative of a resistance between the first measurement electrode and the ground 116 through the conductive material of the skin 104. Similar measurements can be made for each of the measurement electrodes 110 at the respective sensing channels 120 in the skin 104 to discriminate locations of the applied forces.

Simultaneously, the total force applied across the skin 104 can be measured in a voltage divider scheme with an artificial resistor 114. The artificial resistor 114 may be a resistor. As an alternative, the artificial resistor 114 is a conductive pathway that is electronically resistive but not a resistor. The artificial resistor 114 can be positioned such that a conductive path between any and all measurement electrodes 110 and the ground 116 passes through the artificial resistor 114. After a voltage or current is applied to the skin 104, such as by the power source 118 via the power electrode 106, a total voltage 122 is measured at the artificial resistor 114. The total voltage 122 and the known resistance of the artificial resistor 114 can be used to determine the total resistance of the skin 104. For example, where $V_{TOT}$ is total voltage 122, $V_{IN}$ is input voltage, $R_{ART}$ is the resistance of the artificial resistor 114, and $R_{TOT}$ is the total resistance of the skin 104, the following general relationship can be used to determine $R_{TOT}$:

$$R_{TOT} = R_{ART}\left(\frac{V_{IN}}{V_{TOT}} - 1\right).$$

The total resistance of the skin 104 can be indicative of total force applied on the skin 104. Accordingly, a change in the total voltage 122 can be indicative of a change of total resistance of the skin 104 caused by a total force. The artificial resistor can have a range of resistance from about 100 Ohms (Ω) to about 10 MegaOhms (MOhms). For example, the artificial resistor can have a resistance on the order of at least about 10 Ohms, 100 Ohms, 1000 Ohms, $10^4$ Ohms, $10^5$ Ohms, $10^6$ Ohms, $10^7$ Ohms, or more. The artificial resistor can have a resistance on the order of at most about $10^7$ Ohms, $10^6$ Ohms, $10^5$ Ohms, $10^4$ Ohms, 1000 Ohms, 100 Ohms, 10 Ohms, or less. The artificial resistor can have a resistance less than about 100 Ohms. The artificial resistor can have a resistance of more than about $10^7$ Ohms.

The different voltage measurements at or involving the sensing channels 120 and/or the artificial resistor 114 can be monitored in real-time. Real-time can include a response time of less than 1 second, tenths of a second, hundredths of a second, or a millisecond. Real-time can include a simultaneous or substantially simultaneous occurrence of a first event (e.g., application of force by an object onto a sensor) relative to a second event (e.g., measurement of said force). All of the measurement processes, processing processes such as execution of one or more algorithms by a control system, monitoring signals received from electrodes, responses and reactions to sensing, such as those described above or further below, is capable of happening in real-time. The sensing control system can be configured to make the determinations described herein in real-time.

Beneficially, via the abovementioned measurement configuration, the same device (e.g., the robotic end effector 100) can determine both the location of a force and total force applied by an object without building in additional sensory structures onto the device. The robotic end effector 100 may be capable of discriminating discrete types of information about an interaction with a physical object, such as bump events, impacts, grasp force, location of different forces, presence or lack thereof of the physical object, shape of the physical object, and pose estimation of the physical object relative to the robotic end effector 100.

Another significant advantage of the two layer configuration of the device, having a skin layer and a core layer, is its robustness. For example, the exposed skin layer may be resistant to damage. The skin may be capable of functioning as a sensory layer even in the event of receiving physical damage, including permanent physical damage, such as a scratch, tear, dent, or cut in the skin or scraping or wearing off of an outer layer of the skin. The skin may be capable of functioning as a sensory layer in the event of breach. For example, a torn, cut, or scraped skin may be capable of functioning as a sensory layer as long as at least some skin is present on the device. In some instances, the skin may also be resistant to chemical damage. In some instances, the sensing control system may be re-calibrated periodically or upon the skin receiving damage to ensure accuracy and precision of sensing. The skin may also function as an insulating layer for the core and/or the more fragile electronics embedded therein or below the skin, such as to insulate from external impact and forces. The materials required for the two layers, such as a conductive elastomeric skin material and a conductive metal core material may also be obtained at relatively low costs allowing for significantly lower manufacturing cost. As described elsewhere herein, the skin layer may comprise one or more layers, allowing for other multi-layer configurations (e.g., three layers, four layers, five layers, six layers, seven layers, etc.).

In some instances, instead of having an inner core (e.g., 108), the core or its functional equivalent may be provided as an additional layer to the skin (e.g., 104). For example, the additional layer may be a conductive layer coupled to a ground electrode. The skin assembly (including the additional layer) may be provided as a standalone sensing system. In some instances, the skin assembly may be, or be part of, a wearable device (e.g., sensing garment).

In some instances, sensing can be provided on different faces of a robotic end effector. For example, sensing can be provided on all faces that are configured to (or anticipated to) contact or come in proximity to a target object.

Figure 2:
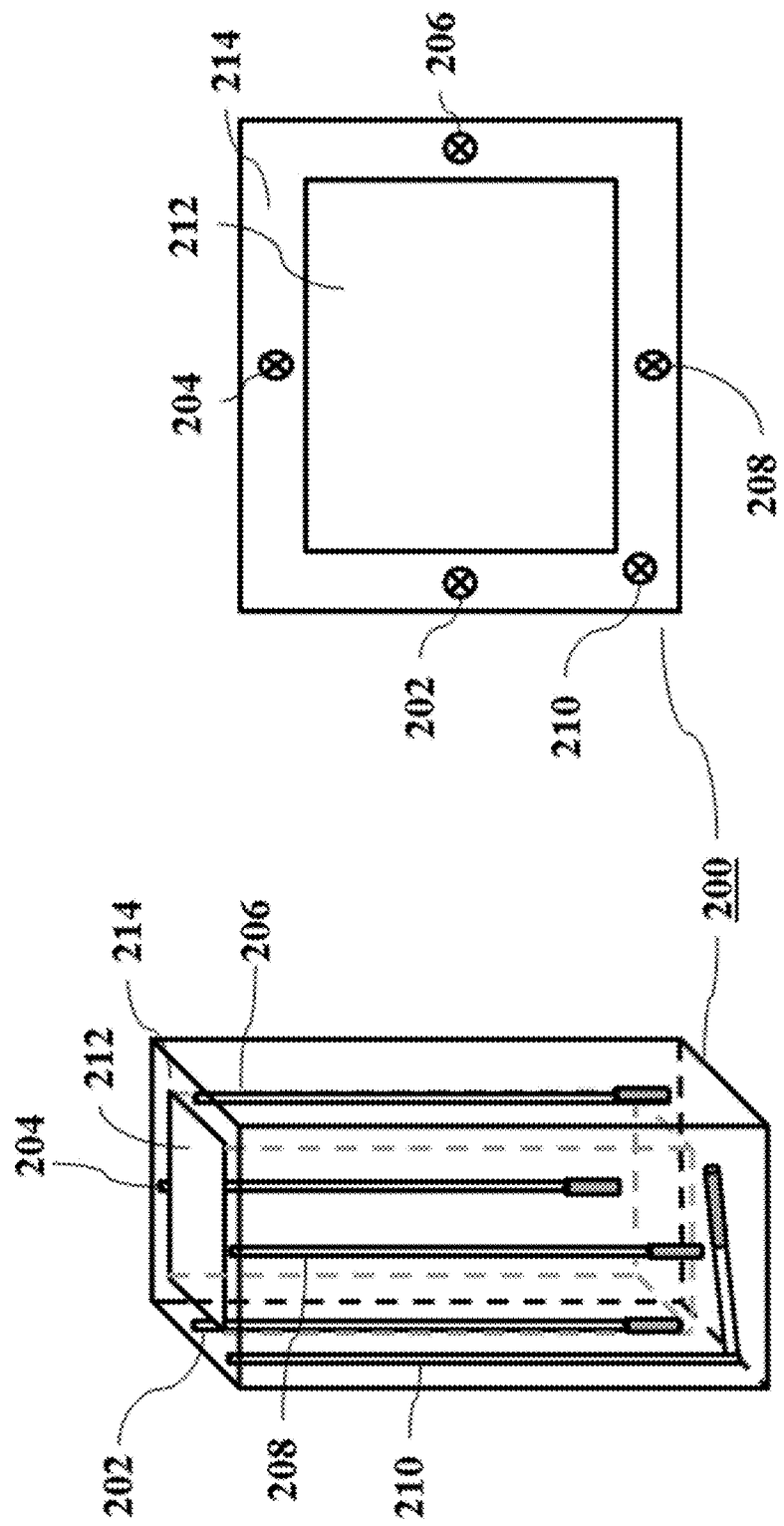
FIG. 2A shows a perspective view of a 5-sided sensor.
FIG. 2B shows a top view of the 5-sided sensor of FIG. 2A.

FIG. 2A shows a perspective view of a robotic end effector with five sensory faces. FIG. 2B shows a top view of the robotic end effector with the five sensory faces of FIG. 2A. A robotic end effector 200 can comprise two parts, a core 212 and a skin 214. The skin 214 can surround the core 212, entirely or in part. The core 212 can have a higher electrical conductivity, or lower resistance or impedance, than the skin 214. In some instances, properties of the core 212 can correspond to the properties of the core 102 of the robotic end effector 100, and properties of the skin 214 can correspond to the properties of the skin 104 of the robotic end effector 100. For example, the core 212 can be substantially rigid or semi-rigid, and comprise conductive material, such as a metal. The skin 214 can comprise a substantially flexible material, such as a polymeric material (e.g., elastomer), textile material, or a polymeric-textile blend of materials. The skin 214 can be conductive. The skin 214 can further comprise doping agents and/or foaming agents, such as foam and carbon black, to vary mechanical (e.g., rigidity), thermal, and electrical (e.g., conductivity) properties of the material.

The skin 214 can be adjacent to the core 212 and surround the core 212, entirely or in part. The skin 214 can be fastened to the core 212, such as via fastening methods described elsewhere herein. For example, the skin 214 and the core 212 can complete a form-fitting pair, in which the skin 214 can glove the core 212. When fastened, the skin 214 can be fixed relative to the core 212. In some instances, the skin 214 may have some flexibility to move relative to the core 212, such as to slide or rotate about or against at least a surface of the core 212. The fastening can be temporary or permanent, as described elsewhere herein. The skin 214 and/or the core 212 can be temporarily or permanently deformed (e.g., stretched, compressed, etc.) and/or disfigured (e.g., bent, wrinkled, folded, creased, etc.) or otherwise manipulated when fastened or during fastening. In some instances, the core 212 and the skin 214 can be fastened with one or more electrodes and/or wiring thereof positioned and/or fastened between the core 212 and the skin 214.

The robotic end effector 200 may have a generally cubical structure having five faces not including a top face (which is a non-contacting surface to a target object). The five faces can be a bottom face and four side faces which are each configured to and/or capable of contacting the target object. In other instances, the robotic end effector 200 can have a different type of structure and/or a different number of faces. While FIGS. 2A and 2B show an exemplary robotic end effector having only five sensory faces, the number of sensory faces is not limited as such. For example, the robotic end effector can have greater than or fewer than five sensory faces. A face can be substantially flat and/or planar. Alternatively or in addition, the face can be curved or otherwise non-planar. Different faces may be discrete. In some instances, the robotic end effector 200 may have one continuous face.

Where sensing on a particular face of the robotic end effector 200 is desired, one or more electrodes can be coupled to the particular face of the skin 214. An electrode can be embedded or otherwise integrated in the particular face of the skin 214, such as via methods described elsewhere herein. For example, each electrode can be routed into the polymeric material of the skin 214 as independent conductive pathways and/or high conductivity component volumes. The conductive pathway can have a higher conductivity (or lower resistance or impedance) than the surrounding, or adjacent, material of the skin 214. A given electrode can be configured to have a sensing channel located on the desired face of the skin 214. Referring to FIGS. 2A and 2B, a first electrode 202 can be embedded in a left face, a second electrode 204 can be embedded in a back face, a third electrode 206 can be embedded in a right face, a fourth electrode 208 can be embedded in a front face, and a fifth electrode 210 can be embedded in a bottom face of the robotic end effector 200. In such a configuration, sensing can be provided on all five faces. That is, the robotic end effector 200 can achieve facial contact discrimination to determine which one or more faces that the target objects contacts.

The skin 214 can change properties in response to an applied force, such as an application of normal force, compression, torque, or shear stress or force. In some instances, the skin 214 can respond with a physical deformation. Alternatively or in addition, the skin 214 can respond by changing various properties, such as impedance or resistance. The skin 214 can be configured to change properties when stressed in one dimension, or in multiple dimensions (e.g., two dimensions, three dimensions, etc.). Such changing properties can be quantified, for example by one or more electrodes (e.g., electrodes 202, 204, 206, 208, 210, etc.) transmitting signals indicative of electrical properties, such as voltage, current, resistance, and/or impedance of where the one or more electrodes are located.

A current or voltage can be applied to the skin 214, and voltage measurements for each electrode (e.g., electrode 202, 204, 206, 208, or 210, etc.) can be monitored. When the target object applies a force on a particular face of the robotic end effector 200, the skin 214, especially at or near the particular face, may change properties, such as impedance or resistance. The voltage measured at the electrode embedded in the particular face can change with changing impedance or resistance. Thus, a change in voltage measurement for an electrode located on a particular face can be indicative of an application of force at or near the particular face. The voltage measurements, and changes thereof, for the different electrodes in each face can be monitored and compared to determine which face a particular force was applied on.

In some instances, a plurality of electrodes can be embedded in each sensory face of the robotic end effector 200. For example, a sensory face may have at least about 2, 3, 4, 5, 6, 7, 8, 9, 10, 11, 12, 13, 14, 15, 16, 17, 18, 19, 20, 30, 40, 50, 100 or more electrodes. In some instances, the plurality of electrodes can be configured to differentiate not only facial contact location but location within the face. In some instances, a sensory face of a robotic end effector may have a plurality of electrodes configured as in FIG. 1 such as to enable discrimination of both total force as well as force location on the sensory face. For example, each sensory face may be capable of discriminating total force applied on the sensory face as well as a location of force applied on the sensory face.

Figure 3:
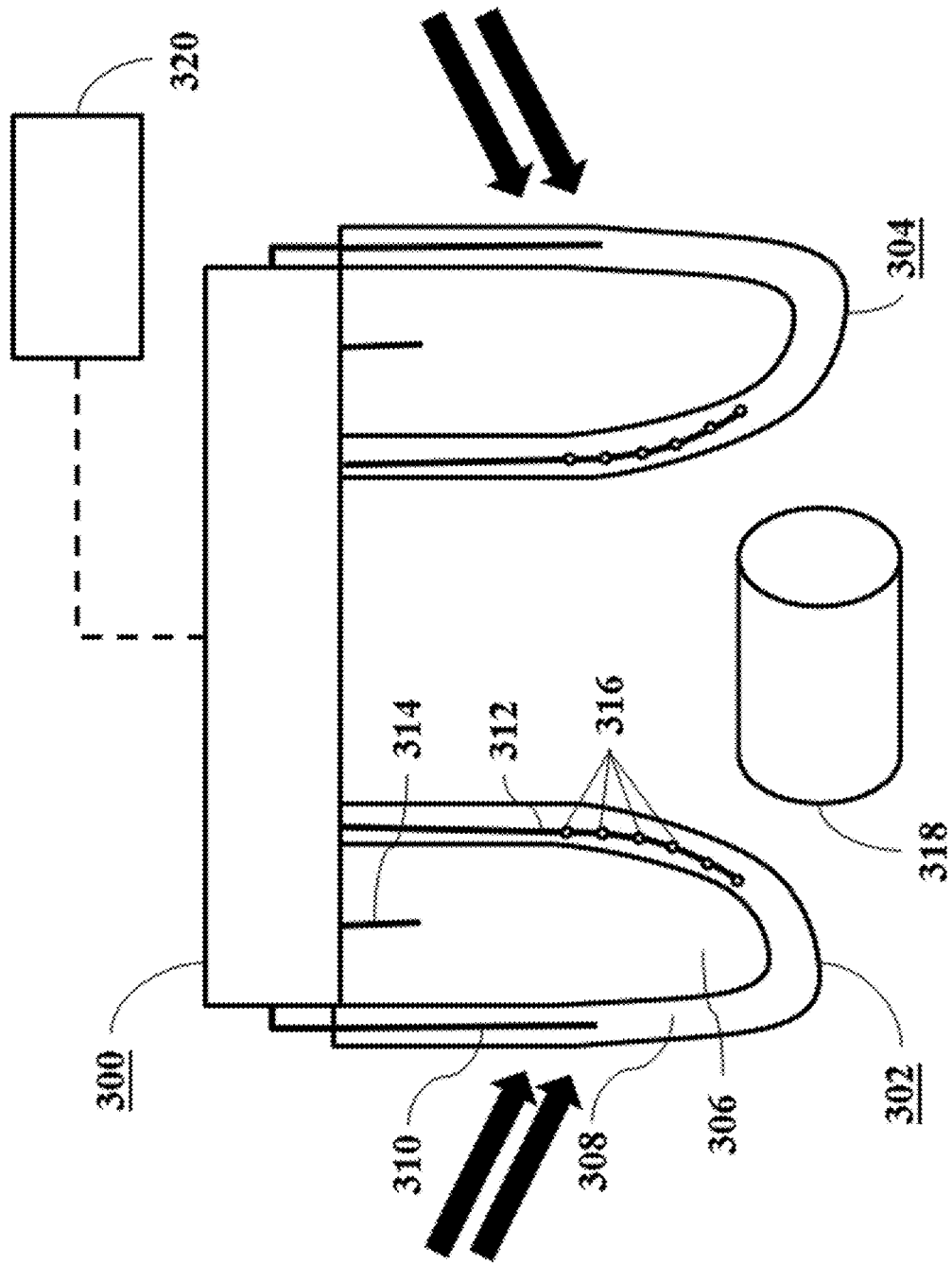
FIG. 3 shows a sensing system in a robotic end effector in operation.

FIG. 3 shows a sensing system in a robotic end effector in operation. A gripping robot 300 can comprise two robotic end effectors, a first robotic end effector 302 and a second robotic end effector 304. The gripping robot 300 can be configured to interact with a physical object 318. For example, the gripping robot 300 can be capable of picking up the physical object 318, such as by the two robotic end effectors 302, 304 converging from a diverged state, and/or placing down the physical object 318 at a desired location, such as by the two robotic end effectors 302, 304 diverging from a converged state.

In some instances, one or both of the two robotic end effectors 302, 304 and respective components thereof can correspond to the robotic end effector 100 in FIG. 1 and components thereof. Alternatively or in addition, one or both of the two robotic end effectors 302, 304 and respective components thereof can correspond to the robotic end effector 200 in FIG. 2 and components thereof. For example, the first robotic end effector 302 may comprise two parts, a core 306 and a skin 308. In some instances, the core 306 can be part of and/or an extension of the body of the gripping robot 300. The skin 308 can surround the core 306, entirely or in part. The core 306 can have a higher electrical conductivity, or lower resistance or impedance, than the skin 308. A power electrode 310 can be coupled to the skin 308, and a ground electrode 314 can be coupled to the core 306. A plurality of measurement electrodes 312 having sensing channels 316 can be coupled to the skin 308. An electrode can be embedded in the skin 308, such as via methods described elsewhere herein (e.g., high conductivity volume components, high conductivity threads, molding, 3D printing, etc.). The plurality of measurement electrodes 312 can be placed in locations on the skin 308 that is likely to, or configured to, contact target objects, such as the target object 318. For example, the plurality of measurement electrodes 312 can be embedded into an inner face (or region) of the first robotic end effector 302. The second robotic end effector 304 may have substantially the same, symmetric, or similar configurations as the first robotic end effector 302.

The electronic components, such as the electrodes coupled to the robotic end effectors can be electrically coupled to a sensing control system 320. Alternatively or in addition, one or more other sensors of the gripping robot 300 can be communicatively coupled to the sensing control system 320. The sensing control system 320 can communicate with the gripping robot 300 via wired or wireless (e.g., WI-FI, Bluetooth®, Near Field Communication (NFC), radio frequency, etc.) connections. The sensing control system 320 can be remote to the gripping robot 300. In some instances, the sensing control system 320 can comprise a controller, microcontroller, processor, and/or microprocessor. The sensing control system 320 can be configured to receive electrical signals from one or more electrodes and/or data from one or more sensors coupled to the robotic end effectors 302, 304.

The sensing control system 320 can be capable of processing the electrical signals and/or data received, such as to determine, compute, and/or discriminate discrete types of information about an interaction of one or more robotic end effectors with the physical object 318, such as but not limited to bump events, impacts, total grasp force, location of different forces, presence or lack thereof of the physical object 318, shape of the physical object 318, and pose estimation of the physical object 318 relative to one or more of the robotic end effectors. For example, the sensing control system 320 can be capable of implementing one or more algorithms to determine, compute, and/or discriminate the discrete types of information from the electrical signals and/or data. Based at least in part on the information (e.g., total force, location of force, pose of physical object, etc.) determined, computed, and/or discriminated, the sensing control system 320 can transmit instructions to control or manipulate the gripping robot 300 to perform an action, such as to grab, release, pick, place, rotate, move in one or more directions, stay at rest, and/or another action. The sensing control system 320 may receive and/or transmit data and/or instructions in real-time, such as to control interactions of the gripping robot 300 with the physical object 318 in real-time.

While FIG. 3 shows the gripping robot 300 as having two robotic end effectors, the number of robotic end effectors is not limited to such. For example, the gripping robot 300 can have more than two or fewer than two robotic end effectors that are configured to, individually or collectively, sense and/or act to implement the systems and methods described herein. While a gripping robot is described, the robot can be any other type of robot. The sensing control system 320 can be capable of transmitting instructions to one or more robotic end effectors of a robot to individually or collectively perform an action. Instructions can be transmitted individual or collectively. Instructions can be transmitted simultaneously in parallel and/or discretely. Furthermore, while only one sensing control system is shown in FIG. 3 there may be a plurality of sensing control systems that are individually or collectively implementing the systems and methods described herein. For example, a first control system may be capable of receiving data, processing data, and transmitting processed data to a second control system. The second control system may be capable of receiving data, processing data, and transmitting instructions to the first control system and/or the gripping robot. Other control systems can perform the same or different functions.

In some instances, a grid of electrodes in a sensor can increase resolution of sensing.

Figures 4A, 4B:
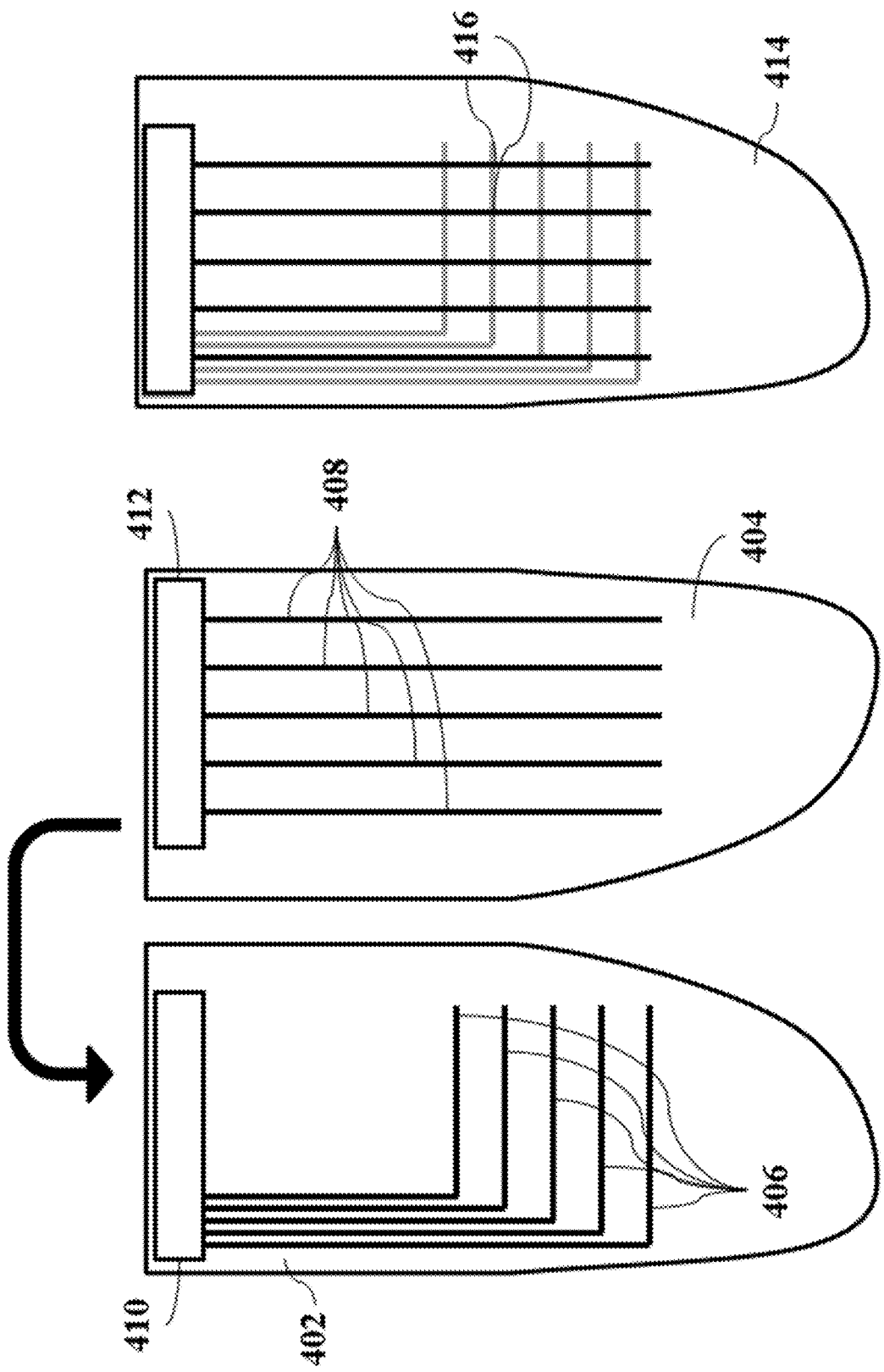
FIG. 4A shows unfolded layers of a sensing system with a grid of electrodes for providing higher resolution.
FIG. 4B shows folded layers of a sensing system with a grid of electrodes for providing higher resolution.

FIG. 4A shows unfolded layers of a sensing system with a grid of electrodes for providing higher resolution. FIG. 4B shows folded layers of a sensing system with a grid of electrodes for providing higher resolution. A first layer of sensor material 402 and a second layer of sensor material 404 can be adjacent to the other. The two layers can be fastened to each other to create a single sensor unit 414. One or both layers can comprise an elastomer. One or both layers can be textured at the interface with the other layer, such as in a linear pattern or any other pattern (e.g., circular shapes, triangular shapes, etc.).

The first layer of sensor material 402 can comprise a first set of electrodes 406 coupled to the sensor material 402. Each of the first set of electrodes may be embedded or integrated in the sensor material 402, as described elsewhere herein. For example, each electrode can be a conductive thread, conductive elastomeric component volumes (e.g., tunnels), or otherwise conductive pathways. A given electrode of the first set of electrodes 406 may define a conductive path in a direction. The conductive path may or may not be linear. The conductive paths in the first set of electrodes 406 may or may not be substantially parallel, such as in a first direction. The first set of electrodes can be wired to an electronic bus 410. The second layer of sensor material 404 can comprise a second set of electrodes 408 coupled to the sensor material 404. Each of the first set of electrodes may be embedded or integrated in the sensor material 404, as described elsewhere herein. A given electrode of the second set of electrodes 408 may define a conductive path in a direction. The conductive path may or may not be linear. The conductive paths in the second set of electrodes 408 may or may not be substantially parallel, such as in a second direction. The second direction can be different from the first direction. The second set of electrodes can be wired to an electronic bus 412. In some instances, the electronic bus 410 and the electronic bus 412 can be the same electronic bus, such that both the first set of electrodes 406 and the second set of electrodes 408 are wired (e.g., conductive) to the same electronic bus. The electronic bus can be a printed circuit board.

When the first layer of sensor material 402 with the first set of electrodes 406 is combined with the second layer of sensor material 404 with the second set of electrodes 408 to form the sensor unit 414, the overlay of the first set of electrodes 406 and the seconds set of electrodes 408 can form a grid of electrodes having a plurality of intersections (e.g., intersections 416, etc.). Electrical signals from both sets of electrodes 406, 408 can be combined to locate one or more of the plurality of intersections for higher resolution of sensing. For example, referring to FIG. 4A, whereas the first layer of sensor material 402 provides five axes of sensing for each of the five electrodes in the first set of electrodes 406 in a first direction, and the second layer of sensor material 404 provides five axes of sensing for each of the five electrodes in the second set of electrodes 408 in a second direction, referring to FIG. 4B, the sensor unit 414 comprising the grid of electrodes can provide 25 coordinates of sensing for each intersection between the two sets of electrodes 406, 408.

While FIGS. 4A and 4B show substantially parallel electrodes in each layer, the electrodes in a layer can be non-parallel. While FIGS. 4A and 4B show the sets of electrodes being substantially perpendicular, the sets of electrodes can be non-perpendicular. There may be more than two layers of sensor material, each layer having a set of electrodes embedded therein (or otherwise coupled thereto). The interfacing layers may be textured.

In some instances, one or more sensing layers can be textured to increase sensitivity. The one or more sensing layers can be textured, such as with microstructures, to determine shear load. Examples of microstructures are provided in U.S. patent application Ser. No. 15/460,440, which is entirely incorporated herein by reference. Alternatively or in addition to, one or more sensing layers may be textured by roughening.

Figure 5:
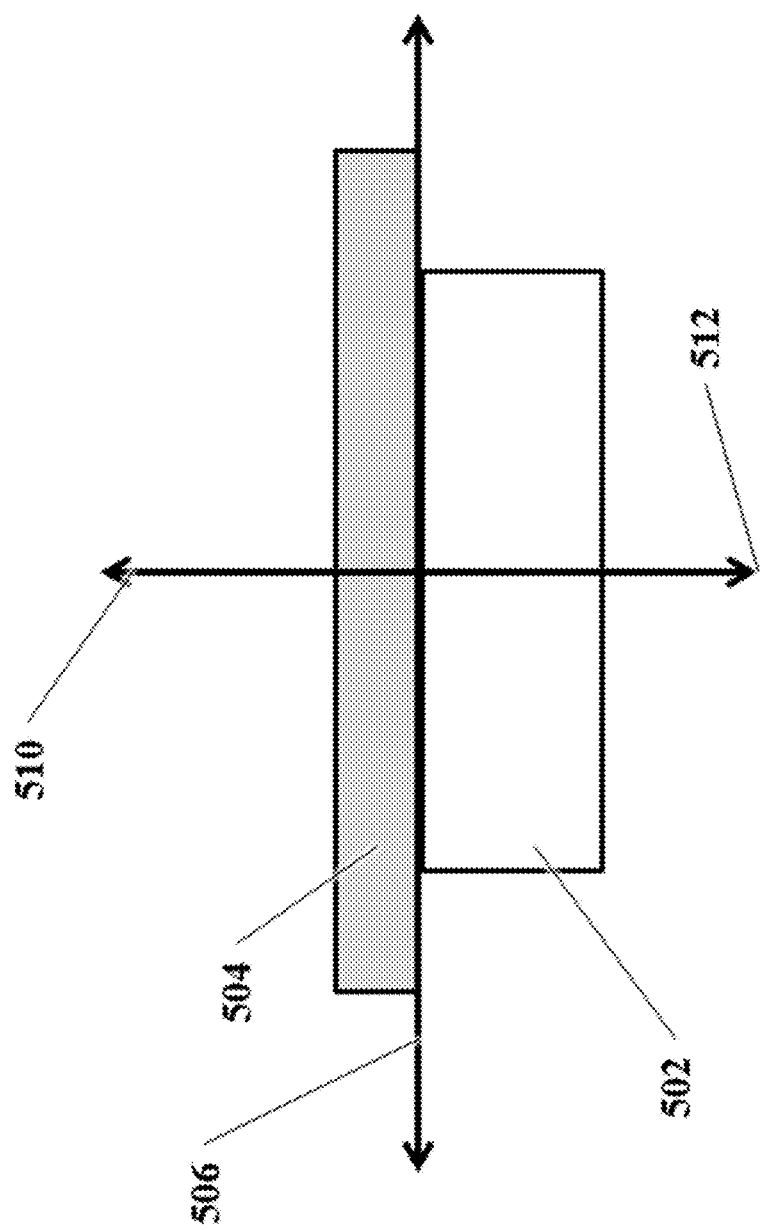
FIG. 5 shows a schematic force diagram of a gripping surface interacting with a target surface.

FIG. 5 shows a schematic force diagram of a gripping surface interacting with a target surface. When a robotic end effector 504 contacts a surface of a physical object 502, there can be three characteristic forces: a grasp force 512, a normal (and/or adhesion) force 510, and a shear force 506. The robotic end effector 504 can have a surface configured to interface a surface of the physical object 502. The grasp force 512 can be a force oriented towards the surface of the physical object 502. The normal force 510 can be a force oriented away from the surface of the physical object 502. The shear force 506 can be tangential to the interface of the robotic end effector 504 and the physical object 502. In some instances, the grasp, shear, and/or adhesion forces can be individual or collective forces acting on or resulting from the robotic end effector 504. Not shown is a gravitational force, which may apply in environments that have gravity.

When one or more robotic end effectors manipulate an object, such as to pick and place the object, during manipulation, the object may slip against one or more surfaces of the robotic end effectors. This can hinder a desired action to be performed with or on the object. It is therefore beneficial to be able to detect or sense a shear load on a robotic end effector. Provided are systems and methods for sensing shear load on a robotic end effector. One or more sensing layers can be textured, such as with microstructures, to determine shear load. In some instances, the elastomeric skin (e.g., skin 104, skin 214, skin 308, etc.) which is adjacent and facing the rigid core (e.g., core 102, core 212, core 306, etc.) of a robotic end effector can be textured with a plurality of microstructures.

FIG. 6A illustrates a perspective view of exemplary microstructures in a sensing system in an unloaded state. FIG. 6B illustrates a perspective view of exemplary microstructures in a sensing system in a loaded state. Referring to FIG. 6A, a plurality of microstructures 602 may populate a surface 604 of an elastomeric skin of a robotic end effector. The microstructures 602 can be imprinted or otherwise textured onto the surface 604. In some instances, the microstructures 602 can comprise the same material as the elastomeric skin. The surface 604 can face a core of the robotic end effector that the elastomeric skin is adjacent to. The plurality of microstructures 602 can be configured to interface with a surface of the core (not shown) of the robotic end effector. The surface 604 of the elastomeric skin can represent a sample portion of a larger surface of the elastomeric skin.

Surfaces comprising microstructures, such as the surface 604, may also be referred to as backing layers. A microstructure stalk may comprise two ends, a first end rooted in the backing layer and a second end, such as a tip of the stalk, extending longitudinally away from the backing layer. The tip of a microstructure stalk may be pointed. Alternatively the tip of a microstructure stalk may be flat, rounded, or comprise a more complex pattern. A microstructure may be symmetric or asymmetric. Each of the microstructures 602 may comprise substantially uniform geometric structures. For example, FIG. 6A shows an array of uniform wedge-like microstructures wherein the cross-sectional front view of each microstructure is substantially triangular with a base rooted on the surface 604 and a tip extending longitudinally away from the surface 604. Alternatively, the microstructures 602 may comprise conical, cylindrical, cubical, trapezoidal, or other more complex geometric structures with similar or different cross-sectional shapes.

The microstructures 602 can have micro-scale dimensions. For instance, a microstructure can have a maximum dimension of less than about 300 micrometers (μm), 250 μm, 200 μm, 150 μm, 140 μm, 130 μm, 120 μm, 110 μm, 100 μm, 90 μm, 80 μm, 70 μm, 60 μm, 50 μm, 45 μm, 40 μm, 35 μm, 30 μm, 25 μm, 20 μm, 15 μm, 10 μm, 9 μm, 8 μm, 7 μm, 6 μm, 5 μm or less. A maximum dimension of the microstructure may be a dimension of the microstructure (e.g., length, width, height, altitude, diameter, etc.) that is greater than the other dimensions of the microstructure. In one example, the wedge-like microstructure can have a dimension of about 60 μm in height, 20 μm in width, and 200 μm in length. In some instances, each of the microstructures 602 may be laid out on the surface 604 in an evenly-spaced array or a grid-like pattern. For example, an edge of the base of each microstructure 602 may be separated from the closest edge of the base of a neighboring microstructure by a distance of about 20 μm to about 40 μm. In other instances, each of the microstructures 602 may be laid out in an arbitrary pattern with non-uniform gaps between each microstructure.

The elastomeric skin and the microstructures 602 textured thereon can have a lower electrical conductivity than the rigid core. In the unloaded state, as in FIG. 6A, the tips of the wedge-like microstructure 602 allow only for minimal contact area between the microstructures and the surface of the rigid core (not shown), which allows for relatively low current flow. When a shear load is applied to the microstructures 602 in the direction 610, the microstructures 602 can conform, or bend, against the surface of the rigid core (not shown), as in FIG. 6B, such that the contact area between the microstructures and the surface of the rigid core significantly increases, which allows for relatively high current flow. When the shear load is relaxed, the microstructures 602 can revert to the initial unloaded state, as in FIG. 6A. The microstructures 602 may comprise a compliant material (e.g., elastomers) that can withstand repeated structural conformations between the unloaded state and the loaded state.

FIG. 7A shows a cross-sectional side view of a plurality of microstructure stalks in an unloaded state. FIG. 7B shows a cross-sectional side view of the plurality of microstructure stalks in a loaded state. FIGS. 7A and 7B are not drawn to scale. A person of ordinary skill in the art will recognize that microstructures having different geometric structures than the ones shown in FIGS. 7A and 7B can be used. A robotic end effector can comprise a rigid core 716 and an elastomeric skin 710. The elastomeric skin 710 can be adjacent to the core 716. The elastomeric skin 710 and the core 716 can be conductive. The elastomeric skin 710 and the core 716 can have different electrical conductivities. The robotic end effector may interface with a physical object 750.

Referring to FIG. 7A, a plurality of wedge-shaped microstructure stalks 708 stemming from a surface of the elastomeric skin 710, and facing the core 716, can be in an unengaged state. In some instances, a flex circuit 706 can be embedded in the elastomeric skin 710. The flex circuit 706 can comprise a plurality of sensing channels 720. The plurality of sensing channels 720 may be spaced out through the plane of the flex circuit 706. In some instances, each of the sensing channels 720 may be positioned on the flex circuit 706 in an evenly-spaced array or a grid-like pattern. In other instances, each of the sensing channels 720 may be laid out in an arbitrary pattern with non-uniform gaps between each channel. In some instances, each of the sensing channels 720 may be positioned on one or more key reference locations. A sensing channel 720 can be an electrode. The robotic end effector may comprise a power channel 702, such as coupled to the elastomeric skin 710, and a ground channel 704, such as coupled to the core 716.

The elastomeric skin 710 and the core 716 may comprise a material of different conductivity. For example, the rigid core 716 may comprise a material (e.g., metal) one or more orders of magnitude more conductive than the material (e.g., silicone rubber) of the elastomeric skin 710. A shear load on the robotic end effector, as a result of an interaction with the object 750, may be detected or sensed by letting a current flow through the elastomeric skin 710 and measuring a voltage or current between two reference channels. The current can be applied through the power channel 702. Alternatively, the current can be applied through other electrodes. Without shear load, relatively high resistance will result in a conductive path 712 between the elastomeric skin 710 and the core 716 because of low contact area between the tips of the microstructure stalks 708 and the surface of the core 716.

Referring to FIG. 7B, when a shear load is present due to the object 750, the plurality of wedge-shaped microstructure stalks 708 will conform against the surface of the rigid core 716. With shear load, relatively low resistance will result in the conductive path 712 between the elastomeric skin 710 and the core 716 because of the larger contact area between the conformed tips of the microstructure stalks 708 and the surface of the core 716. The change in resistance can be determined from voltage measurements between the ground channel 704 and one or more sensing channels 720. Signals received from one or more electrodes can be monitored in real-time to detect shear force. The flex circuit 706 and/or the electrodes can be electrically coupled to a control system (not shown) that is configured to process the signals from the electrodes to detect shear force. Thus, a presence, magnitude, and/or location of shear force can be sensed by texturing the elastomeric skin surface interfacing the core with a plurality of microstructures.

While sensors provided herein have been described in the context of an elastomeric skin layer and a rigid core layer, the combination of layers in a sensor is not limited as such. For example, a sensor may comprise a plurality of layers of polymeric material. One or more of the plurality of layers may be textured with the same or different patterns (e.g., microstructures) to provide increased resolution in sensing and/or more dynamic range. Textured surfaces of different layers can interface.

In some instances, a tactile sensor can comprise a single layer of compressible material. Multiple layer configurations can be susceptible to damage due to shear forces causing the multiple layers to separate and frequent disturbances at the interface of the layers. Beneficially, the single layer configuration can provide more robustness. The single layer configuration can use the compression of internal cells of a porous material to detect forces.

Figure 8B:
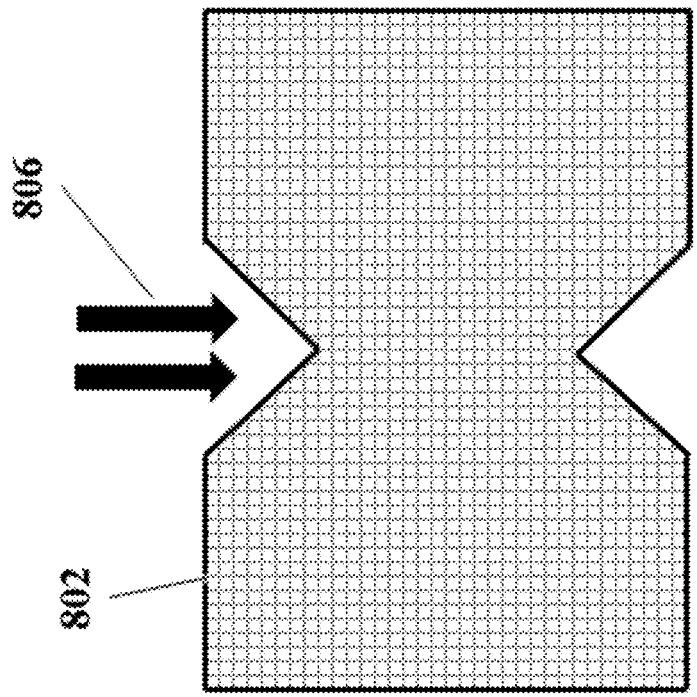
FIG. 8B shows a side view of a conductive foam in a compressed state.
Figure 8A:
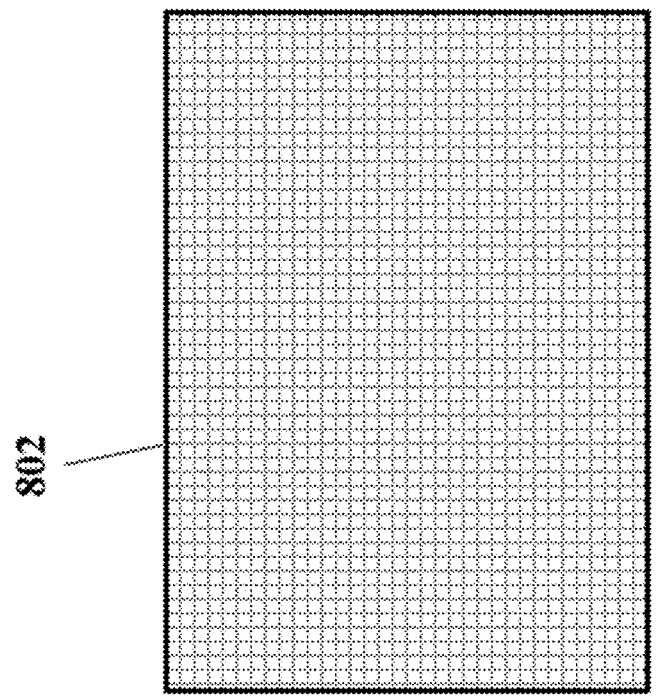
FIG. 8A shows a side view of a conductive foam in an uncompressed state.

FIG. 8A shows a side view of a conductive foam in an uncompressed state. FIG. 8B shows a side view of a conductive foam in a compressed state. A sensor 802 can comprise one layer of sensing material. The sensing material can be compressible. The sensing material can be elastomeric. In some instances, the sensing material can be microporous and/or macroporous. The sensing material can comprise an air matrix or a fiber matrix. The sensing material can be conductive. For example, the sensing material can be a conductive foam. The conductive foam can be formed by adding a salt to liquid elastomer before curing the liquid elastomer and dissolving out to form intercellular channels and/or tunnels in the resulting foam. The resulting foam can be a substantially stiff, porous material that is compressible and de-compressible.

The sensor material can have a power electrode coupled to a top face of the sensor material. For example, the power electrode can be embedded or integrated at or near the top face of the sensor material. The sensor material can have a ground electrode coupled to a bottom face of the sensor material. For example, the ground electrode can be embedded or integrated at or near the bottom face of the sensor material. The sensor material can have a measurement electrode coupled to an intermediate location between the top face and the bottom face of the sensor material. The measurement electrode can be embedded or integrated at or near the middle region of the sensor material. When a current is applied through the power electrode, the current can flow from the top face of the sensor material through the body of the sensor 802, where the measurement electrode is located, and to the bottom face of the sensor material. The electrodes may be placed in different regions of the sensor 802 depending on orientation of the sensor 802 and an anticipated direction of application of force and/or compression. In some instances, a plurality of measurement electrodes can each be coupled to a distinct location (e.g., region) in the sensor 802 for higher resolution. Referring back to FIG. 8A, when no force is applied, the sensor 802 is uncompressed and has relatively larger volume resistivity from the top face to the bottom face. Referring back to FIG. 8B, when a force 806 is applied, the sensor 802 is compressed and has relative lower volume resistivity from the top face to the bottom face. Thus, voltage measurements at one or more measurement electrodes will change with changing resistance of the sensor material. Force (and/or pressure) on the sensor 802 can be detected by monitoring changes in electrical signals from one or more electrodes.

Figure 9:
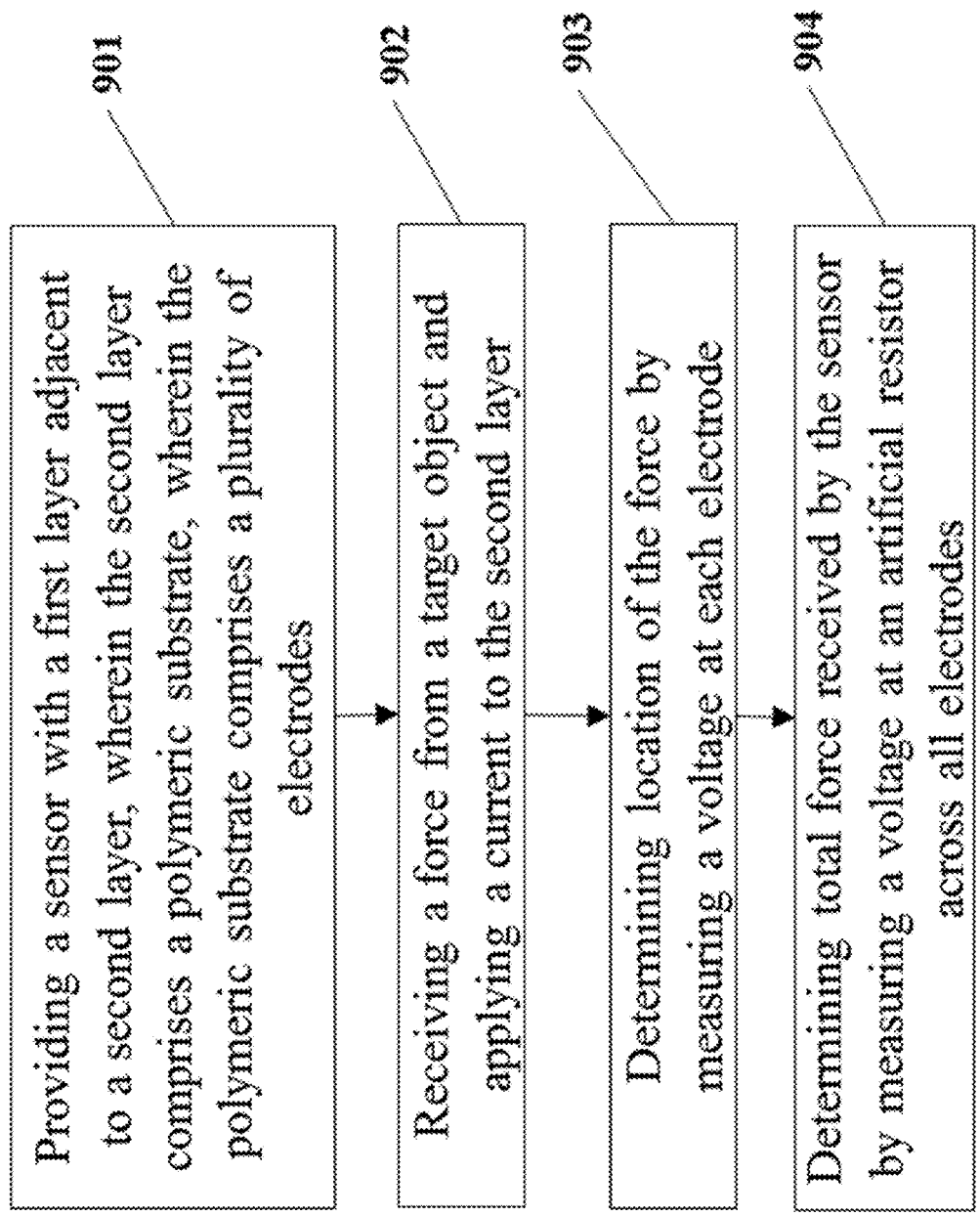
FIG. 9 illustrates a method of detecting location and total force.

FIG. 9 illustrates a method of detecting location and total force. At a first operation 901, a sensor can be provided. The sensor can comprise a first layer and a second layer, wherein the first layer is adjacent to the second layer. At least one of the layers can comprise a polymeric or polymeric-textile substrate, such as an elastomer. The polymeric or polymeric-textile substrate can comprise a plurality of electrodes. Next 902, the sensor can receive a force applied by a target object. A current or voltage can be applied, such as through one of the plurality of electrodes, to the polymeric or polymeric-textile substrate. The polymeric or polymeric-textile substrate may provide varying resistance depending on the magnitude and location of the force. Next 903, a location of the force can be determined by measuring a voltage at each electrode and monitoring for changes. Next 904, a total force received by the sensor can be determined by measuring a voltage at an artificial resistor that lies in the conductive path between all measurement electrodes and ground.

Figure 10:
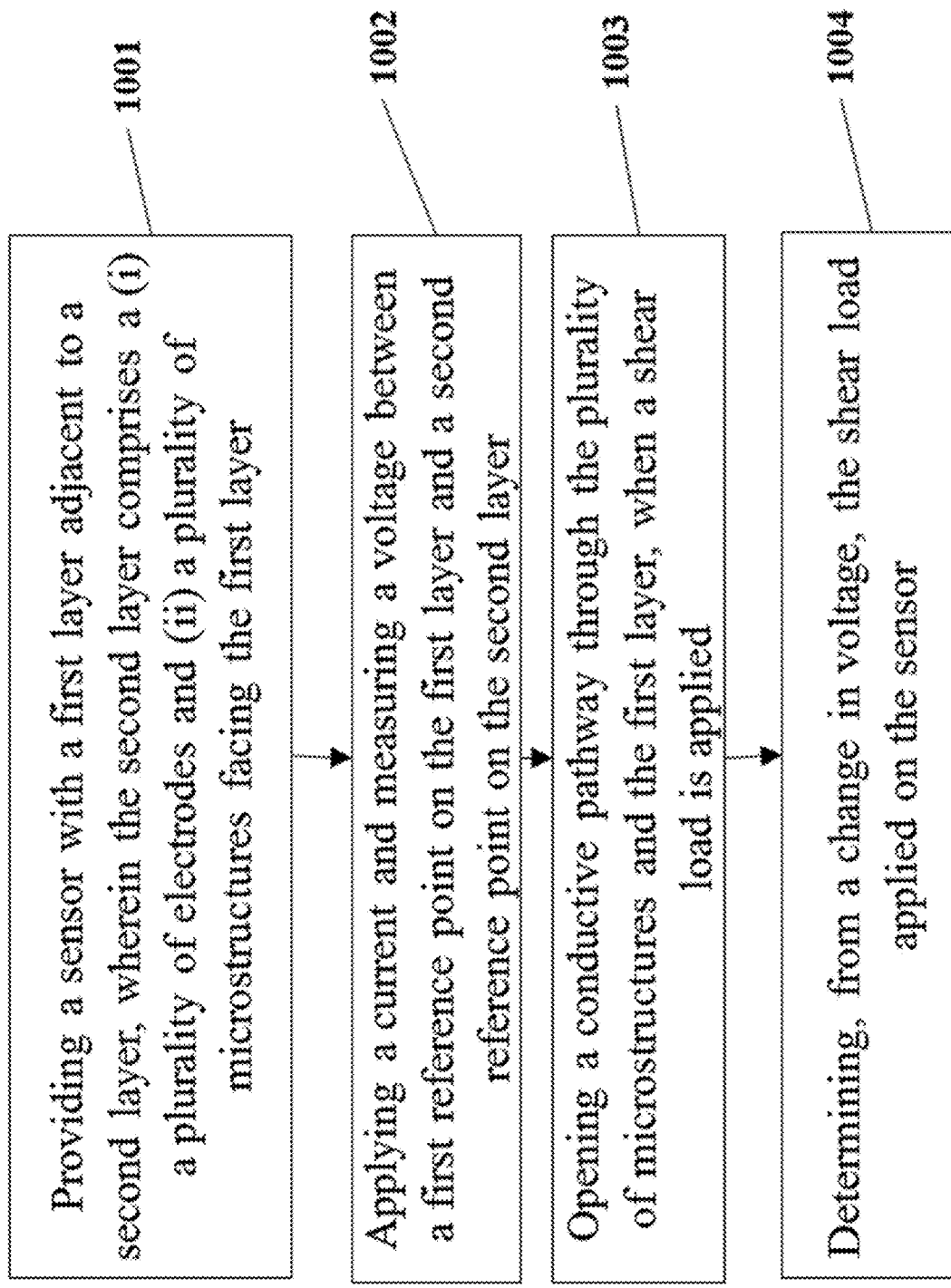
FIG. 10 illustrates a method of detecting shear load.

FIG. 10 illustrates a method of detecting shear load. At a first operation 1001, a sensor can be provided. The sensor can comprise a first layer and a second layer, wherein the first layer is adjacent to the second layer. The second layer can comprise a polymeric or polymeric-textile substrate. The polymeric or polymeric-textile substrate can comprise a plurality of electrodes and a plurality of microstructures facing the first layer. The microstructures can be wedge-shaped. Next 1002, a current or voltage can be applied to the polymeric or polymeric-textile substrate. A voltage can be measured between a first reference point on the first layer and a second reference point on the second layer. Next 1003, when a shear load is applied, the microstructures on the second layer can conform and/or bend against the first layer, thus increasing real contact area between the first layer and the second layer. A conductive pathway between the first layer and the second layer can be opened and/or improved when the shear load is applied. Next 1004, the shear load applied on the sensor can be determined by monitoring a change in voltage between the first reference point and the second reference point.

In some instances, a sensor assembly may comprise a plurality of layers. For example, the plurality of layers can support a grid of electrodes (e.g., see FIG. 4A-4B). Power and/or ground may be rotated sequentially or non-sequentially around the grid of electrodes in different layers to increase resolution of sensing. Beneficially, the resolution of the grid may be significantly increased without increasing the number of traces in the sensor assembly. In some aspects, a layer may comprise thin copper sheets layered with conductive silicone or other conductive elastomer. In some aspects, a layer may comprise insulating material. A layer may comprise elastomeric material. The plurality of layers may be fastened in a sensor assembly, such as by heated lamination, such that the interface between the layers is dust proof and water proof.

Figure 11:
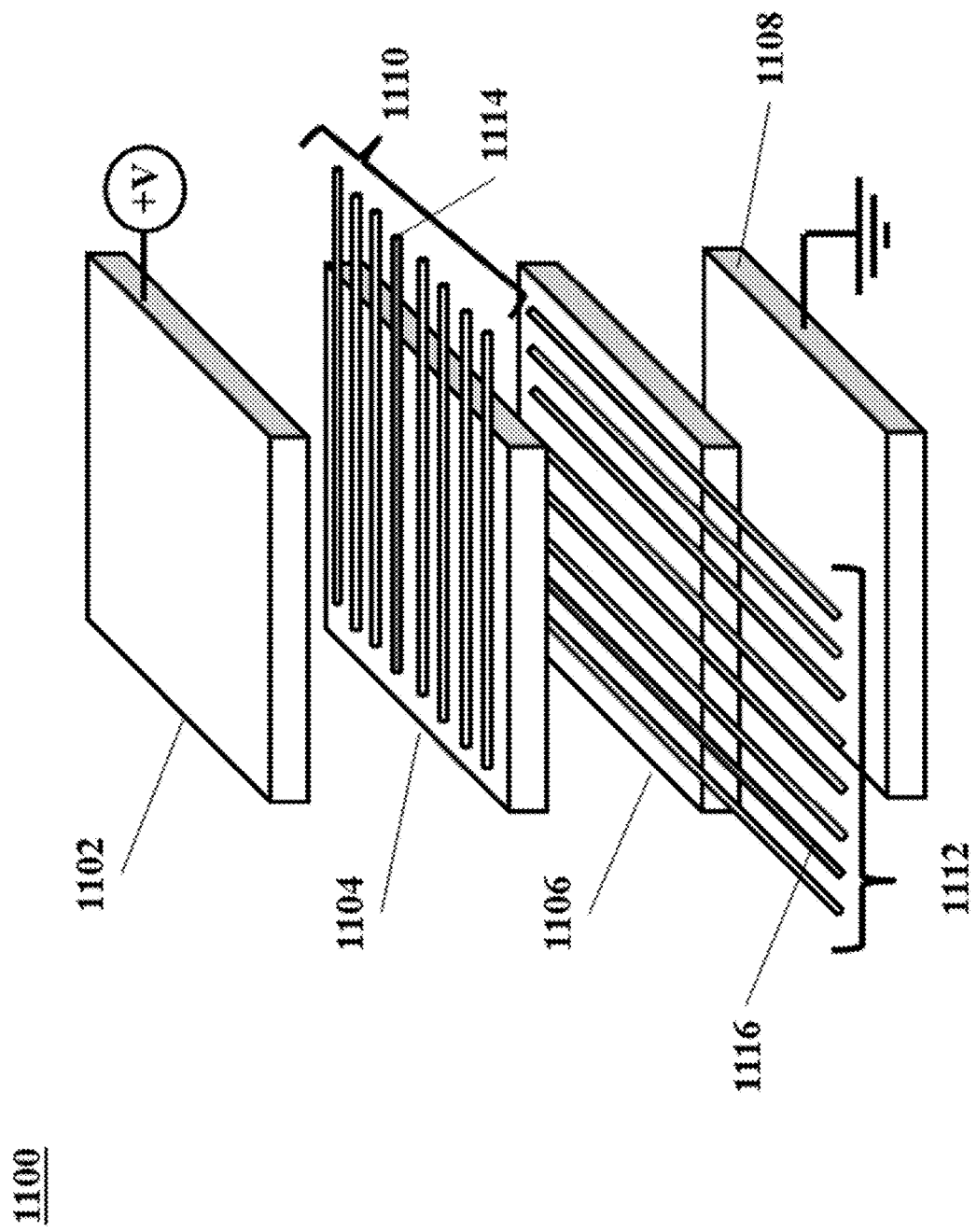
FIG. 11 shows an exploded view of a sensing system with a plurality of layers.

FIG. 11 shows an exploded view of a sensing system with a plurality of layers. A sensing assembly 1100 can comprise a top layer 1102, a first sensing layer 1104, a second sensing layer 1106, and a bottom layer 1108. In some instances, the assembly 1100 may comprise a skin for a robotic end effector. For example, the assembly 1100 can be configured to glove or otherwise surround an end effector (e.g., robotic finger) core, entirely or in part, as described elsewhere herein. In some instances, properties of the assembly 1100 can correspond to the properties of the skin 104 of the robotic end effector 100.

The top layer 1102 and the bottom layer 1108 may surround the first sensing layer 1104 and the second sensing layer 1106. For example, the top layer, first sensing layer, second sensing layer, and bottom layer may be adjacent to each other in that order. In some instances, a surface of the top layer 1102, bottom layer 1108, first sensing layer 1104, and/or the second sensing layer 1106 interfacing with another layer can be textured (e.g., linear patterns, radial patterns, arbitrary patterns, etc.) to increase sensitivity. In some instances, a surface of any layer and/or the core (e.g., effector) interfacing with the other can be textured to increase sensitivity. In some instances, the different layers can have different material properties, such as in conductivity and/or conformability.

The top layer 1102 may be electrically coupled to a load cell configured to apply a current or voltage to the assembly 1100. In some instances, the top layer 1102 can be configured as a mesh. Alternatively or in addition, the top layer 1102 can otherwise be electrically coupled to a power electrode, voltage source, or power supply. For example, a power electrode can be attached or fastened to an outer surface of the top layer 1102. Alternatively, the power electrode can be embedded or integrated in the top layer 1102 material. The bottom layer 1108 may be or comprise a measurement resistor coupled to the ground. The bottom layer 1108 may be configured as a mesh. In some instances, a measurement electrode can be coupled to the bottom layer 1108. In some instances, a ground electrode can be coupled to the bottom layer 1108. For example, the ground electrode can be attached or fastened to an outer surface of the bottom layer 1108. Alternatively, the ground electrode can be embedded or integrated in the bottom layer 1108 material. In some instances, the top layer and/or bottom layer may comprise insulating material. In some instances, the top layer and/or bottom layer can comprise polymeric, textile, polymeric-textile, and/or elastomeric material.

A first set of electrodes 1110 can be integrated in the first sensing layer 1104 and communicate with a control system (not shown) via an electrical connection to the control system. For example, independent high conductivity compartment volumes (electrodes) may be embedded in a material with relatively lower conductivity compartment volume, as described elsewhere herein. Alternatively or in addition, the first set of electrodes 1110 can be otherwise positioned on and/or fastened to the first sensing layer 1104, without embedding. In some instances, the first set of electrodes 1110 can be configured as a mesh (e.g., copper mesh). The first set of electrodes 1110 may be arranged as a linear array in a first direction. Alternatively, the first set of electrodes 1110 may be arranged in other regular or irregular patterns, or arbitrarily (e.g., non-linear, circular, arcuate, bent, radial, etc.), in the first sensing layer 1104. Each electrode in the first set of electrodes 1110 may be used as a measurement sensing point (or axis).

A second set of electrodes 1112 can be integrated in the second sensing layer 1106 and communicate with a control system (not shown) via an electrical connection to the control system. Alternatively or in addition, the second set of electrodes 1112 can be otherwise positioned on and/or fastened to the second sensing layer 1106, without embedding. In some instances, the second set of electrodes 1112 can be configured as a mesh. The second set of electrodes 1112 may be arranged as a linear array in a second direction. For example, the second direction may be substantially perpendicular to the first direction (of the first set of electrodes 1110). Alternatively, the second direction may be at any angle relative to the first direction. In some instances, the second direction may be substantially parallel to the first direction. Alternatively, the second set of electrodes 1112 may be arranged in other regular or irregular patterns, or arbitrarily, in the second sensing layers 1106. In some instances, the first set of electrodes 1110 and the second set of electrodes 1112 can communicate with the same control system. In other examples, the two sets of electrodes can communicate with different control systems. Each electrode in the second set of electrodes 1112 may be used as a measurement sensing point (or axis).

The two sensing layers, while illustrated to have a total of 16 electrodes with 8 electrodes in each sensing layer, may have any number of electrodes. For example, there may be a total of at least about 2, 3, 4, 5, 6, 7, 8, 9, 10, 11, 12, 13, 14, 15, 16, 17, 18, 19, 20, 30, 40, 50 or more electrodes. Alternatively or in addition, there may be at most about 50, 40, 30, 20, 19, 18, 17, 16, 15, 14, 13, 12, 11, 10, 9, 8, 7, 6, 5, 4, 3, or 2 electrodes. In some instances, the two sensing layers may have the same number of electrodes. Alternatively, the two sensing layers may have different numbers of electrodes. In some instances, one or more multiplexers can function to establish electrical connection with a different combination of electrodes, such as the power electrode, measurement electrode, and sensing electrodes in the sensing layers. For example, the multiplexer can be an 8 channel or 16 channel multiplexer.

When the first sensing layer 1104 and the second sensing layer 1106 are combined to form the assembly 1100, the overlay of the first set of electrodes 1110 and the seconds set of electrodes 1112 can form a grid of electrodes having a plurality of intersections, as described elsewhere herein (e.g., see FIGS. 4A-4B). Electrical signals from both sets of electrodes 1110, 1112 can be combined to locate one or more of the plurality of intersections for higher resolution of sensing.

In a first sensor firing pattern, the top layer 1102 can serve as power plane, the bottom layer 1108 as ground plane through (or connected in series with) a measurement resistor, and the two sensing layers 1104, 1106 as sensing planes. In the example illustrated in FIG. 11, with 16 connection channels, a total of 16 measurements may be made for each of any 14 measurement sensing points of 16 total measurement sensing points in the two sensing layers, the measurement resistor, and the load cell (e.g., $V_1$, $V_2$, $V_3$, $V_4$, $V_5$, $V_6$, $V_8$, $V_9$, $V_{10}$, $V_{11}$, $V_{12}$, $V_{13}$, $V_{14}$, $V_{16}$, $V_m$, $V_{load\ cell}$, respectively). A control system may be configured to combine the plurality of measurements to determine a location and/or magnitude of a force detected by the sensor assembly 1100. The control system may use linear interpolation. The control system may use non-linear interpolation.

In a second sensor firing pattern, the electrical connection between the top layer 1102 and the power supply can be disconnected. The first sensing layer 1104 can serve as power plane, the bottom layer 1108 as ground plane through (or connected in series with) a measurement resistor, and the second sensing layer 1106 as sensing plane. Each electrode (e.g., electrode 1114) in the first set of electrodes 1110 in the first sensing layer 1104 may rotate being the power electrode. Beneficially, rotating the power electrodes provides both higher spatial resolution and higher force sensitivity because pressure applied near a power electrode results in a larger change in current or voltage due to the local electrical field increase. For example, in the example illustrated in FIG. 11, each of the 8 electrodes in the first set of electrodes

1110 may rotate through being the power electrode. For each power electrode, a measurement may be made at each measurement sensing point in the second sensing layer 1106. For example, in the example illustrated in FIG. 11, for each power electrode, 8 data frames may be obtained for each of 8 measurement electrodes (e.g., electrode 1116) in the second set of electrodes 1112 in the second sensing layer 1106. A control system may be configured to combine the plurality of measurements to determine a location and/or magnitude of a force detected by the sensor assembly 1100. The control system may use linear interpolation. The control system may use non-linear interpolation.

In a third sensor firing pattern, the top layer 1102 may serve as the ground plane. Each electrode (e.g., electrode 1116) in the second set of electrodes 1116 in the second sensing layer 1106 may rotate being the power electrode. For example, in the example illustrated in FIG. 11, each of the 8 electrodes in the second set of electrodes 1116 may rotate through being the power electrode. Beneficially, rotating the power electrodes provides both higher spatial resolution and higher force sensitivity as described elsewhere herein. For each power electrode, a measurement may be made at each measurement sensing point in the first sensing layer 1104. For example, in the example illustrated in FIG. 11, for each power electrode, 8 data frames may be obtained for each of 8 measurement electrodes (e.g., electrode 1114) in the first set of electrodes 1110 in the first sensing layer 1104. A control system may be configured to combine the plurality of measurements to determine a location and/or magnitude of a force detected by the sensor assembly 1100. The control system may use linear interpolation. The control system may use non-linear interpolation. In some instances, non-linearly interpolated values may be pre-computed and indexed into a reference (e.g., in memory). Such reference may be retrieved and/or accessed prior to, during, or subsequent to a firing pattern to output a measurement and/or outcome.

The sensing assembly 1100 can have a different number of sensing layers. For example, the sensing assembly can have at least about 2, 3, 4, 5, 6, 7, 8, 9, 10 or more sensing layers. Alternatively or in addition, the sensing assembly can have at most about 10, 9, 8, 7, 6, 5, 4, 3, or 2 sensing layers. The sensing layers may or may not have different material properties. The sensing assembly 1100 can have any number of insulating layers surrounding or between different sensing layers. For example, the sensing assembly can have at least about 2, 3, 4, 5, 6, 7, 8, 9, 10 or more insulating layers. Alternatively or in addition, the sensing assembly can have at most about 10, 9, 8, 7, 6, 5, 4, 3, or 2 insulating layers. The insulating layers may or may not have different material properties. In some instances, the layers may be modified to optimize dynamic range and sensitivity of the sensor assembly. For example, the thickness of the layers may be reduced or fewer layers employed to increase sensitivity. In another example, the thickness of the layers may be increased or more layers employed to decrease sensitivity. Alternatively or in addition, the flux density of a layer may be modified, such as with gaps, holes, foam and/or intermediary fillings to optimize dynamic range and sensitivity of the sensor assembly.

In some instances, one or more layers of an end effector with a sensing system may be separated to mitigate drift and hysteresis. For example, a robotic end effector can comprise an intermediary layer between the core and the skin. Over time, a sensor can be susceptible to drift, which can offset sensor readings from an original calibrated state. For example, such offset readings can appear as systematic errors in the output. Exposure of the sensor material to certain conditions, such as pressure change, temperature extremes, and environmental changes as well as repeated use of the sensor (e.g., causing repeated expansion and contraction of materials) can contribute to drift. In some instances, this can be due to a gradual degradation of sensor components, or an electronic aging of components or reference standards in the sensor. Hysteresis in a sensor can refer to an output that lags an input parameter to the sensor. For example, the sensor may output different values when approaching a measurement state by increasing from a first state (e.g., lower) and approaching the measurement state by decreasing from a second state (e.g., higher).

Figure 12A:
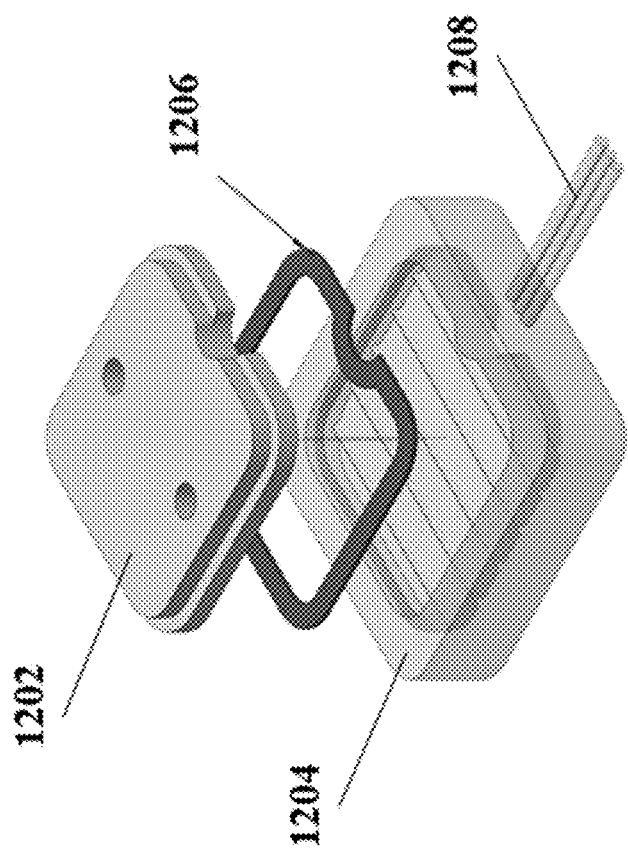
FIG. 12A shows an exploded perspective view of a robotic end effector with an intermediary layer between a core and a skin.
Figure 12B:
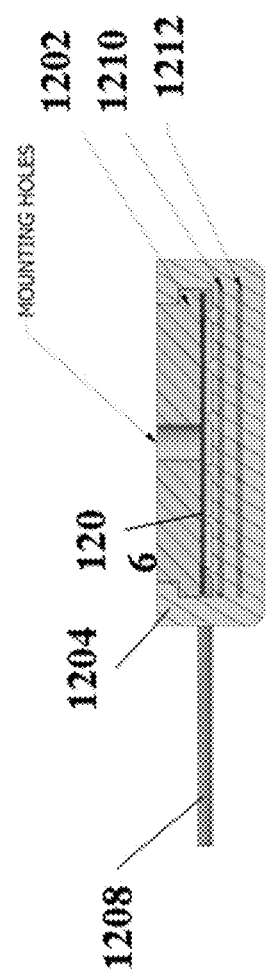
FIG. 12B shows a cross-sectional side view of the robotic end effector of FIG. 11A.

In some instances, the intermediary layer to mitigate drift and hysteresis can be an intermediary band. FIG. 12A shows an exploded perspective view of a robotic end effector with an intermediary layer between a core and a skin. FIG. 12B shows a cross-sectional side view of the robotic end effector with the intermediary layer between the core and the skin.

A robotic end effector can comprise three parts, a core 1202, a skin 1204, and an intermediary band 1206. The skin 1204 can surround the core 1202, entirely or in part, as described elsewhere herein. In some instances, properties of the core 1202 can correspond to the properties of the core 102 of the robotic end effector 100, and properties of the skin 1204 can correspond to the properties of the skin 104 of the robotic end effector 100. In some instances, a surface of the skin 1204 and/or the core 1202 interfacing with the other can be textured (e.g., linear patterns) to increase sensitivity.

One or more electrodes, such as the power electrode(s) 1210 and the measurement electrode(s) 1212 can be integrated in the skin 1204 and communicate with a control system (not shown) via an electrical connection 1208 to the control system. In some instances, the power electrode(s) 1210 can be configured as a mesh (e.g., copper mesh) and/or the measurement electrode(s) 1212 can be configured as a mesh (e.g., copper mesh) for higher sensitivity. The core 1202 can be the ground.

An intermediary band 1206 comprising a cavity can be disposed between the base (e.g., bottom surface) of the core 1202 and the skin 1204 such that at least the base of the conductive core 1202 and the conductive skin 1204 are electrically isolated by the intermediary band 1206 when the robotic end effector is at rest. The intermediary band 1206 can be flexible. The intermediary band 1206 can be non-conductive. The intermediary band can have lower electrical conductivity than the skin. The base of the core 1202 can be adjacent to a first face of the intermediary band 1206, and the skin 1204 can be adjacent to a second face of the intermediary band 1206, the second face being opposite the first face. When the robotic end effector is at a resting state (e.g., receiving no force from a target object), the base of the core 1202 may not contact the skin 1204, thus achieving electrical isolation of the core 1202 (at least the base) and the skin 1204. When the robotic end effector is at a stressed state (e.g., receiving some force from a target object), the skin 1204 may contact the base of the core 1202 by pushing inwards through the cavity of the intermediary band 1206, thus bringing into electrical communication the core 1202 (e.g., the base) and the skin 1204.

The cavity of the intermediary band 1206 may be in any size, shape, or form. The intermediary band 1206 can have a frame defining the cavity. In some instances, the frame can have a width of about 1 mm to 1 m, depending on the size of the gripper. In some instances, the intermediary band 1206 can have a thickness (between the base of the core 1202 and the skin 1204) of at most about 1 mm. In some instances, the intermediary band 1206 can have a thickness that is about the thickness (e.g., diameter) of an electrode, such as a wire.

In some instances, the intermediary band 1206 can have configurations other than a frame defining a cavity. For example, the intermediary band 1206 can define a plurality of cavities (e.g., sheet with holes). In another example, the intermediary band 1206 can comprise sinusoidal, zig-zag, or curvy paths without any cavities, or one or more protrusions and/or depressions. The intermediary band 1206 can have any configuration that allows for the electrical isolation of the base of the core 1202 and the skin 1204 in the resting state but electrical communication of the base of the core 1202 and the skin 1204 in the stressed state upon receipt of a force. In some instances, the intermediary band 1206 can be planar. Alternatively, the intermediary band 1206 can be non-planar, such as to wrap or glove one or more surfaces of the core 1202 and achieve electrical isolation of the one or more surface of the core 1202 from the skin 1204.

Hysteresis and drift can be mitigated by retaining the core 1202 and the skin 1204 in an electrically isolated configuration at a resting state, thus preventing the material(s) from lagging or being affected by previous sensing cycles.

Alternatively or in addition, the intermediary layer to mitigate drift and hysteresis can be an air gap. In some instances, the air gap can be provided between the core and the skin by using an intermediary base to fasten the core and the skin such that the two components are non-contacting at a resting state.

Figure 13A:
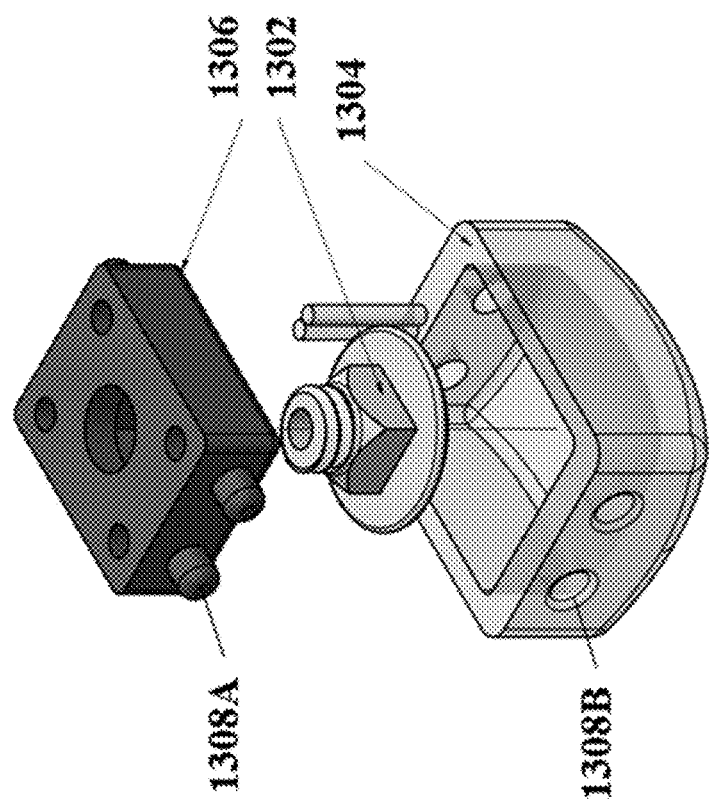
FIG. 13A shows an exploded perspective view of a robotic end effector with a curved core and skin.
Figure 13B:
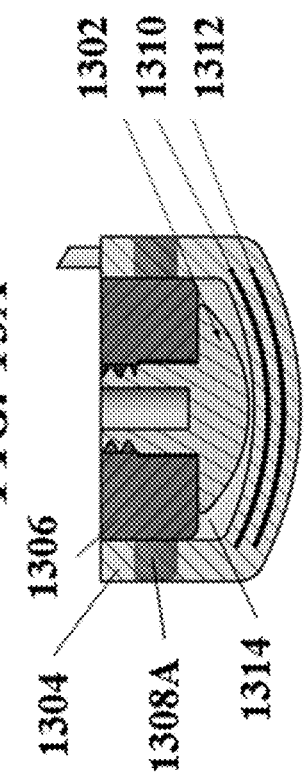
FIG. 13B shows a cross-sectional side view of the robotic end effector of FIG. 13A.

FIG. 13A shows an exploded perspective view of a robotic end effector with a curved core and skin. FIG. 13B shows a cross-sectional side view of the robotic end effector with the curved core and skin.

A robotic end effector can comprise three parts, a core 1302, a skin 1304, and an intermediary base 1306. The skin 1304 can surround the core 1302, entirely or in part, as described elsewhere herein. In some instances, properties of the core 1302 can correspond to the properties of the core 102 of the robotic end effector 100, and properties of the skin 1304 can correspond to the properties of the skin 104 of the robotic end effector 100. In some instances, a surface of the skin 1304 and/or the core 1302 interfacing with the other can be textured (e.g., linear patterns) to increase sensitivity.

One or more electrodes, such as the power electrode(s) 1310 and the measurement electrode(s) 1312 can be integrated in the skin 1304 and communicate with a control system (not shown) via an electrical connection to the control system. In some instances, the power electrode(s) 1310 can be configured as a mesh (e.g., copper mesh) and/or the measurement electrode(s) 1312 can be configured as a mesh (e.g., copper mesh) for higher sensitivity. The core 1302 can be the ground.

An intermediary base 1306 can be disposed between the core 1302 and the skin 1304 such that the conductive core 1302 and the conductive skin 1304 are electrically isolated by the intermediary base 1306 and/or an air gap 1314 when the robotic end effector is at rest. The intermediary base 1306 can be flexible. The intermediary base 1306 can be non-conductive.

The intermediary base 1306 can fasten to the core 1302 via a first fastening mechanism, such as described elsewhere herein. For example, as shown in FIGS. 13A and 13B, the core 1302 can comprise a fastening screw with a threaded protrusion and the intermediary base 1306 can comprise a complementary cavity (or depression) to the protrusion with complementary grooves for the threads on the core 1302. The intermediary base 1306 can fasten to the skin 1304 via a second fastening mechanism, such as described elsewhere herein. For example, as shown in FIGS. 13A and 13B, the intermediary base 1306 can comprise a plurality of protrusions 1308A and the skin 1304 can comprise a complementary cavity 1308B (or depression) to the protrusion 1308A on the core 1302. When the intermediary base 1306 has been fastened to both the core 1302 and the skin 1304, the core 1302 and the skin 1304 may or may not be in contact (e.g., in electrical communication) when the robotic end effector is in a resting state. When they are not in contact in the resting state, such as is illustrated in FIG. 13B, beneficially, the core 1302 and the skin 1304 can be electrically isolated via an air gap 1314 and this can mitigate hysteresis and drift, as described with respect to FIGS. 12A and 12B.

The surface of the core 1302 interfacing the skin 1304 can be non-planar. The interfacing surface can be curved and/or arcuate. For example, the core 1302 can comprise a domed head on a first end and a fastening unit (e.g., threaded protrusion) on a second end. The interfacing surface of the core 1302 can be convex. The interfacing surface of the core 1302 can have a first curvature. The surface of the skin 1304 interfacing the core 1302 can be non-planar. The interfacing surface can be curved and/or arcuate. The interfacing surface of the skin 1304 can be concave. The interfacing surface of the skin 1304 can have a second curvature. The first curvature of the core 1302 can have a higher degree of curvature than the second curvature of the skin 1304.

Beneficially, the varying curvatures of the core 1302 and the skin 1304 can provide higher sensitivity while preserving wide dynamic range. As a result of the curvatures, in some instances, larger forces may be required to increase contact area of the skin 1304 and the core 1302. In some instances, different magnitudes of forces may be required to contact the skin 1304 and the core 1302, depending on location of the force exerted on the skin 1304.

Moreover, the intermediary base 1306 can be used to facilitate attachment or coupling of the sensor system (e.g., robotic end effector) to another part of the robot.

The systems, methods, and devices described herein with respect to certain embodiments may be used in addition to and/or in conjunction with any other systems, methods, and devices described herein with respect to other embodiments. For example, shear load sensing systems, methods, and devices described with respect to FIGS. 7A and 7B may be used in addition to, and/or in conjunction with the robotic end effector 100 of FIG. 1. In another example, the intermediary band 1206 of FIG. 12 can be integrated to any other robotic end effectors having a core and a skin. Additionally, any robotic end effector having a skin layer may benefit from improved robustness and low manufacturing cost, as described elsewhere herein. In another example, the sensing assembly 1100 of FIG. 11 can be wrapped around, entirely or in part, around any robotic end effector described herein.

Sensors, sensing systems, and sensor assemblies of the present disclosure may be toggled between activated and unactivated modes. For example, an unactivated sensor may be activated by applying a voltage or current to one or more electrodes electrically coupled to the sensor, and vice versa by terminating the power supply. A sensor may be powered by any source of power (e.g., batteries, electrochemical cells, capacitors, supercapacitors, fuel cells, power grid, etc.).

EXAMPLES

Figure 15A:
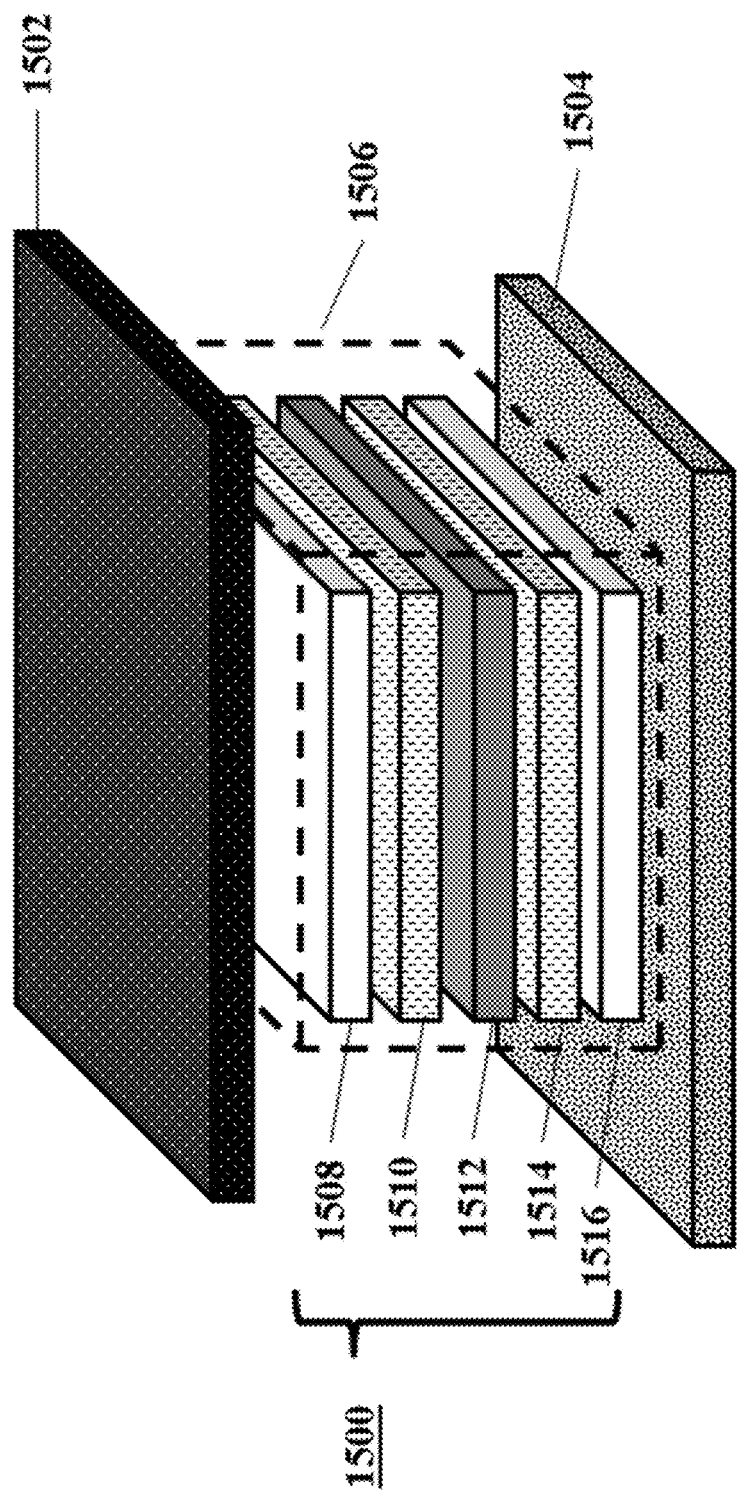
FIG. 15A shows an exploded view of a wearable polymer-textile sensing system.

In an example, the sensing systems of the present disclosure can be used as wearable sensors, such as beneath a spacesuit. FIG. 15A shows an exploded view of a wearable polymer-textile sensing system. The sensor 1500 was constructed from five layers of material: a core elastomeric middle layer 1512 that contains one or more measurement electrodes to serve as the measurement layer, two intermediate layers 1510, 1514 of resistive fabric-polymer (Eeonyx, ~2 kilo-ohms per square inch (k-ohms/sq. inch)) on either side of the core elastomeric middle layer to isolate the measurement layer from the highly conductive power and two layers 1508, 1516 (silver plated nylon) coupled to ground electrodes to sandwich the two intermediate layers 1510, 1514. These layers are then sewn together to complete the sensor 1500. The sensor 1500 is optionally surrounded by a fabric comfort layer 1506. In the example, the sensor 1500 is placed between a spacesuit inner layer 1502 and human skin (e.g., astronaut skin) 1504. A total of 9 different sensor blends were fabricated by varying each of the middle layer 1512 material and the intermediate layer 1510, 1514 materials. The intermediate layer 1510, 1514 material was varied between one of three selections, stretchable Eonyx, non-stretchable Eonyx, and elastomer-only material. The elastomeric middle layer 1512 material was varied between TC5041, SmoothSil 960, and DragonSkin 30, having a hardness of 45A (Shore A units), 60A, and 30A, respectively. The hardness of the elastomers was chosen to be within or proximate to the range of human skin hardness, which is from about 20A to 50A.

Figure 15B:
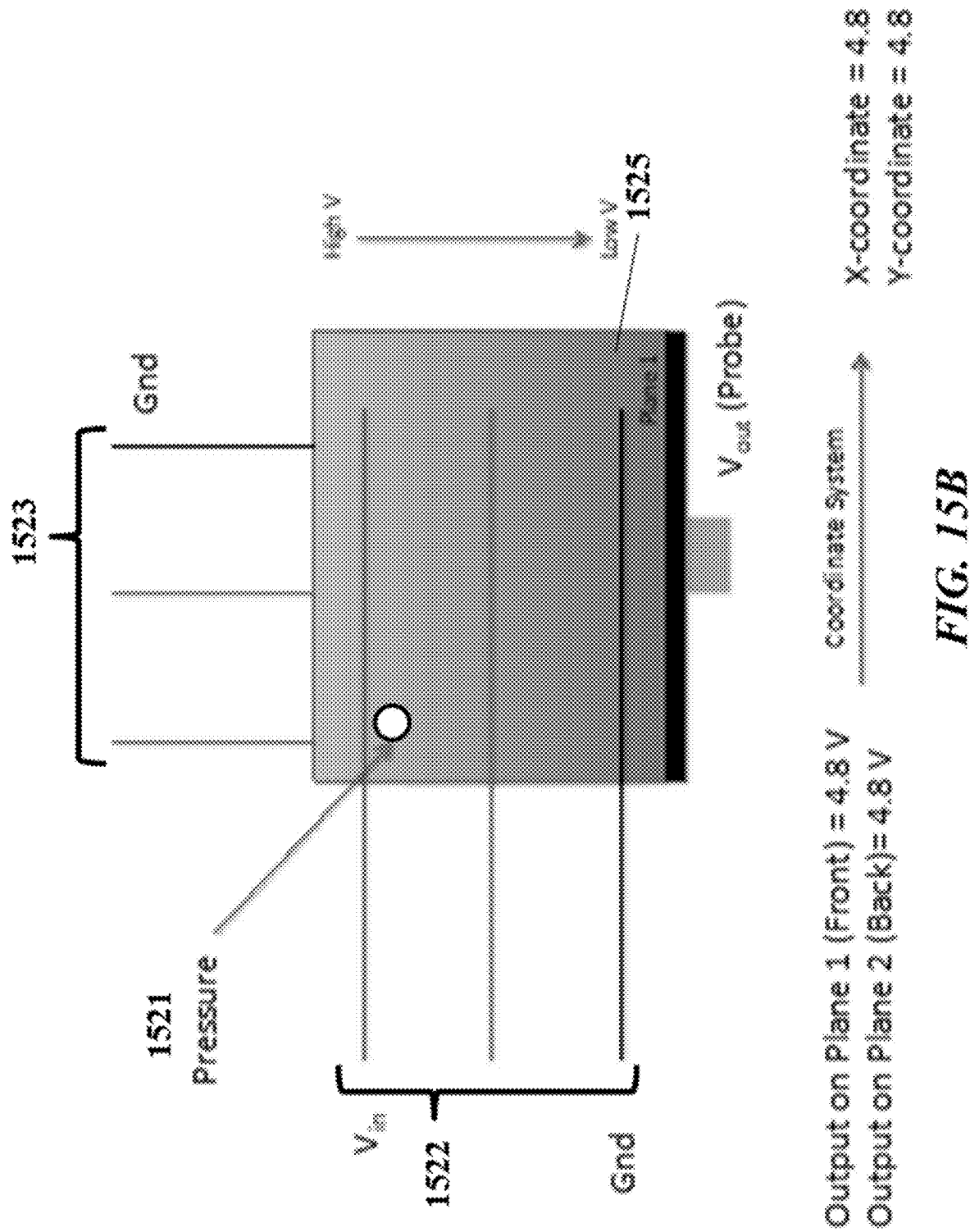
FIG. 15B shows a layer of the wearable polymer-textile sensing system of FIG. 15A.

FIG. 15B shows a layer of the wearable polymer-textile sensing system of FIG. 15A. On each side of layer 1525 (e.g., elastomeric middle layer 1512), three leads 1522, 1523 are in contact with the layer, together creating a grid system that allows distinguishing of position of pressure 1521. A first silver layer (1508 or 1516) acts as the X plane measurement probe, and the other silver layer acts as the Y plane measurement probe. Separating the conductive leads 1522 and 1523 is a minimally conductive layering to prevent shortages between leads and measurement probes. Although not depicted in FIG. 15B, the sensor 1500 contains two sets of the silver plane measurement probe and minimally conductive dividing layer. All of these layers together allow the accurate measurement of position and force.

The sensor 1500 assembly was constructed by doping silicone elastomer with carbon black, multiwall carbon nanotubes, and n-heptane, which swells the silicone polymer network, creating a better mixing environment. After the silicone was doped with the conductive filler, it was pressed into a sheet via the following process. First, nonconductive, two-way stretchable mesh fabric, which when combined with cured silicone creates a more robust elastomer sheet, was secured down to a sheet of Low Density Polyethylene (LDPE) transparency. The uncured, conductive silicone elastomer was pressed into place at the top side of transparency and mesh fabric. A second layer of transparency was placed over this early stage composite and fed through a slip roller, adjusting the height of the top roller each time until the desired thickness was reached. The sheet of the conductive silicone composite was allowed to cure at elevated temperature (FIG. 3). Upon curing, the composite elastomer sheet (e.g., 1512) was cut into shape and checkered (e.g., grid) electrode patterns were drawn onto the top and bottom surfaces (e.g., a first linear array on the top surface being substantially perpendicular to a second linear array on the bottom surface). A conductive thread was placed over the designated electrode patterns, and sewn over with non-conductive thread to secure into place. Nonwoven Eeonyx pressure sensitive material was cut twice into the same shape as the electrode covered sheet of conductive silicone elastomer to provide the two intermediate layers (e.g., 1510, 1514). Each of the Eeonyx material was placed over both sides of the sensor and sewn around the perimeter. Additionally, two pieces of silver coated nylon fabric were cut into the same shape to provide the silver plated layers (e.g., 1508, 1516), but with extra tabs being left on to allow for electrical connections. The perimeter is sewed again with the silver coated nylon fabric, yielding a completed spacesuit sensor.

In another example, a sleeve sensor can be constructed by scaling up the above sheet construction process. A larger transparency is used to create a scaled-up sheet of conductive elastomer composite necessary for fitting over the entirety of the forearm. The larger composite sheet is rolled out and subsequently cured in the electric oven at 60° C. for 20 minutes. The forearm dimensions are measured and the sheet is then cut into shape. Customized measurements can be made for each test subject in order to best characterize in-suit movements. Electrodes are sewn onto each side of the conductive sheet, forming the electrode grid pattern. The density of this grid will depend on the body area being measured. In this example, the grid spacing is 6 cm$^2$ in both X and Y directions. Eeonyx and Silver coated nylon fabric are both cut out into the same shape as the elastomer sheet with electrode pattern sewn on. These two fabrics are layered appropriately and sewn around the perimeter to construct the final five layered sensor sleeve. Because this sleeve will be worn against the body, the sensor interior is covered by a layer of stretchable spandex mesh so as to create a comfort barrier between the sensor and the skin. The spandex comfort layering is cut larger than the sensor (1 cm of additional radial width) and sewn twice, once onto the radial edges; the sensor is shaped into a sleeve where a second seam is sewn along the outer edge of spandex material. The extra spandex material allows the sleeve to expand, fitting larger forearms and increasing surface contact against the skin, resembling a compression sleeve.

Figures 15C, 15D:
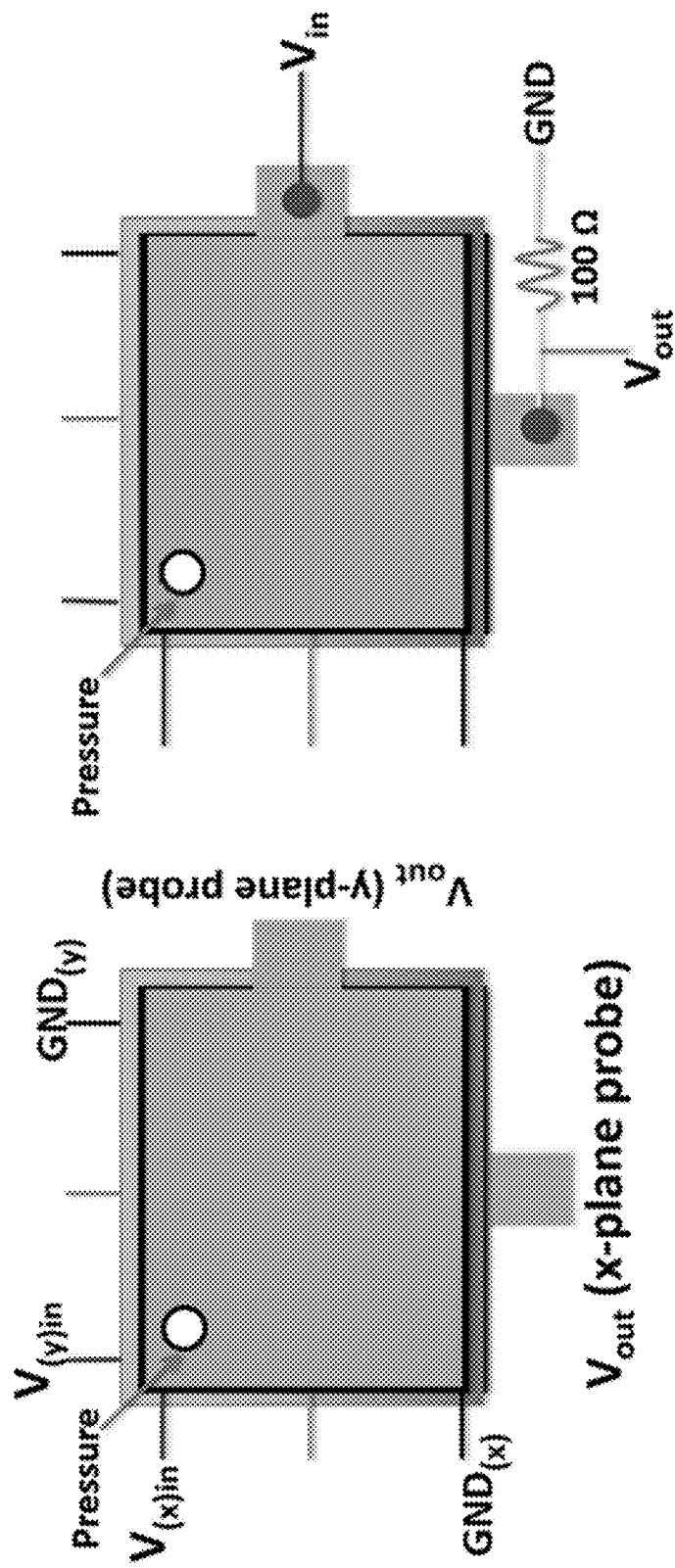
FIG. 15C shows a sample sensor data acquisition wiring schematic for spatial discrimination.
FIG. 15D shows a sample sensor data acquisition wiring schematic for load magnitude measurement.

FIG. 15C shows a sample sensor data acquisition wiring schematic for spatial discrimination, and FIG. 15D shows a sample sensor data acquisition wiring schematic for load magnitude measurement. For the load magnitude measurement schematic, a 100 ohm resistor can be used in the voltage division circuitry.

For sleeve sensors, the sensor measurements can be calibrated to mounting on the forearm. To account for non-linear sensor output, a 3-layer multi-layer perception (MLP) was used to compensate. Artificial neural networks (ANNs) are able to cope with the non-linear response of the sensor during contact events. The ANN used here is a three-layer back-propagation perceptron using a manually constructed C library. First, we construct a linear combination of N input variables (Eqn. 1):

$$A_j = \Sum_{i=1}^{N} W_{ji} X_i + W_{j0} \quad (1)$$

where parameters $W_{ji}$ refer to the weights and $W_{j0}$ refers to the biases of the activation function $A_j$. These M basis function outputs are linearly combined to form the K outputs for which the system was trained:

$$A_k = \Sum_{j=1}^{M} W_{kj} Z_j + W_{k0} \quad (2)$$

The Matlab Neural Network toolbox employs the Levenberg-Marquardt back-propagation algorithm to tune the weights and biases of the ANN. Prior to training, the primary data sets were divided into three sets: 1) a working set (70%), 2) a validation set consisting of 15% of randomly chosen data to prevent over-fitting; and 3) a test set of 15% randomly chosen data used to measure the ANN's ability to generalize after training. Data were gathered by pressing in the four corners and center of the device.

Figure 15E:
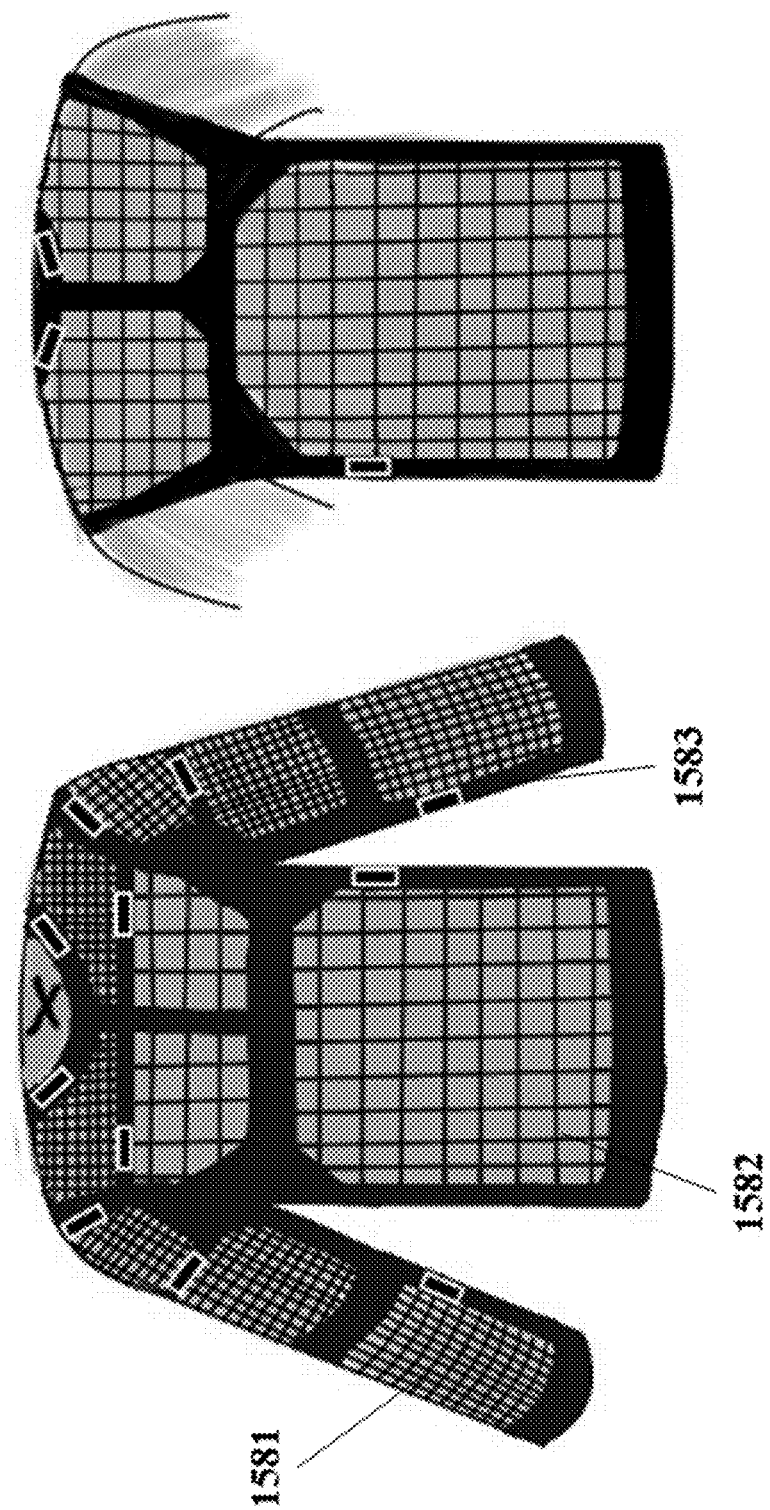
FIG. 15E shows an example of a pressure sensitive garment.

FIG. 15E shows an example of a pressure sensitive garment. The depicted pressure sensitive garment may comprise patches of sensate areas (e.g., 1581, 1582) and non-sensate areas (e.g., 1583). The sensate areas may include discrete (or continuous) patches of high density electrodes (e.g., 1581) and low density electrodes (e.g., 1582). Such varying density may be determined by bodily activity (e.g., lower activity in the back may suggest lower density than the arms or other jointed areas that have higher activity). In some instances the sensing regions can be wired as independent units with each unit's electrodes wired to its own connector. Connector units may be mounted in regions that do not constrict natural biomechanical movement. Connectors may be mounted near the terminal ends of electrodes to mitigate wire failure from dynamic motion.

Computer Systems

Figure 14:
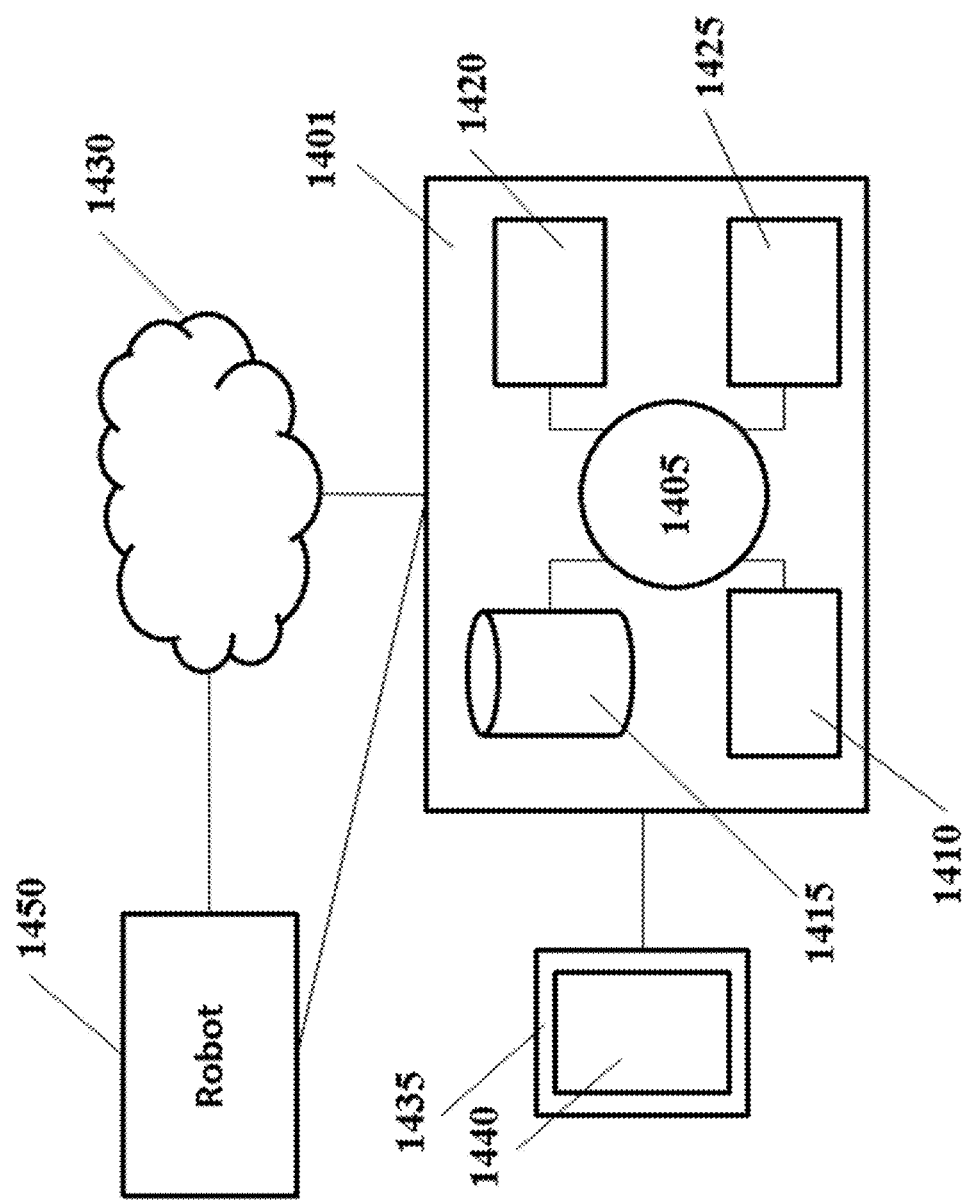
FIG. 14 shows a schematic diagram of a sensing control system.

FIG. 14 shows a schematic diagram of a sensing control system that is programmed to implement the systems and methods of the disclosure. A sensing control system 1401 can be a computer system. In some instances, the sensing control system 1401 can be the sensing control system 320 communicatively coupled to the gripping robot 300. The sensing control system 1401 is programmed or otherwise configured to communicatively coupled to a robot 1450, robotic device, or components thereof (e.g., robotic end effectors). The sensing control system 1401 can be configured to process, receive and transmit data (e.g., electrical signals, manipulation instructions, sensory data, etc.) with the robot 1450. For example, the sensing control system 1401 can be configured to process the electrical signals and/or data received, such as to determine, compute, and/or discriminate discrete types of information about an interaction of one or more robotic end effectors with a physical object, such as but not limited to bump events, impacts, total grasp force, location of different forces, presence or lack thereof of the physical object, shape of the physical object, and pose estimation of the physical object relative to one or more of the robotic end effectors. For example, the sensing control system 1401 can be configured to implement one or more algorithms to determine, compute, and/or discriminate the discrete types of information from the electrical signals and/or data. Based at least in part on the information (e.g., total force, location of force, pose of physical object, etc.) determined, computed, and/or discriminated, the sensing control system 1401 can transmit instructions to control or manipulate the robot 1450 to perform an action, such as to grab, release, pick, place, rotate, move in one or more directions, stay at rest, and/or another action. The sensing control system 1401 may receive and/or transmit data and/or instructions in real-time, such as to sense a physical object in real-time and/or control interaction of the robot 1450 with the physical object in real-time. The sensing control system 1401 can be an electronic device of a user or a computer system that is remotely located with respect to the electronic device. The electronic device can be a mobile electronic device. In some instances, the sensing control system 1401 can be remotely located with respect to the robot 1450. In some instances, the sensing control system 1401 can be located near or adjacent to the robot 1450 and communicate with another computer control system (not shown). In some instances, the sensing control system 1401 can be part of the robot 1450.

The sensing control system 1401 includes a central processing unit (CPU, also "processor" and "computer processor" herein) 1405, which can be a single core or multi core processor, or a plurality of processors for parallel processing. The sensing control system 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The sensing control system 1401 can be operatively coupled to a computer network ("network") 1430 with the aid of the communication interface 1420. A connection to or from the network 1130 can be wired or wireless (e.g., WI-FI, Bluetooth®, Near Field Communication (NFC), radio frequency, etc.). The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the sensing control system 1401, can implement a peer-to-peer network, which may enable devices coupled to the sensing control system 1401 to behave as a client or a server. The robot 1450 can be operatively coupled to the network 1430. For example, the sensing control system 1401 can communicate with the robot 1450 through or over the network 1430. Alternatively or in addition, the sensing control system 1401 can communicate with the robot directly.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system 1401 can be included in the circuit. In some cases, the circuit is an application specific integrated circuit (ASIC).

The storage unit 1415 can store files, such as drivers, libraries and saved programs. The storage unit 1415 can store user data, e.g., user preferences and user programs. The sensing control system 1401 in some cases can include one or more additional data storage units that are external to the sensing control system 1401, such as located on a remote server that is in communication with the sensing control system 1401 through an intranet or the Internet.

The sensing control system 1401 can communicate with one or more remote computer systems through the network 1430. For instance, the sensing control system 1401 can communicate with a remote computer system of a user (e.g., operator of the robot 1450, engineer, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the sensing control system 1401 via the network 1430.

Methods as described herein can be implemented by way of machine (e.g., computer processor) executable code stored on an electronic storage location of the sensing control system 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the sensing control system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The sensing control system 1401 can include or be in communication with an electronic display 1435 that comprises a user interface (UI) 1440 for providing, for example, a visual representation (e.g., graphic, graph, chart, image, statistics, etc.) of information about the physical object and/or forces applied on or by the physical object that are determined by the sensing control system 1401. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1405. The algorithm can, for example, process the electrical signals and/or data received, such as to determine, compute, and/or discriminate discrete types of information about an interaction of one or more robotic end effectors with a physical object, such as but not limited to bump events, impacts, total grasp force, location of different forces, presence or lack thereof of the physical object, shape of the physical object, and pose estimation of the physical object relative to one or more of the robotic end effectors.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for sensing an object, comprising:
   an assembly comprising:
   (1) a first layer comprising a conductive core and a ground electrode, and
   (2) a second layer adjacent to said first layer, wherein said second layer comprises a polymeric or polymer-textile substrate, wherein said polymeric or polymeric-textile substrate includes a power electrode and a plurality of measurement electrodes, and wherein an electrode of said plurality of measurement electrodes is configured to sense changes in electrical resistance or impedance of said polymeric or polymeric-textile substrate at or adjacent to a location of said electrode in said second layer; and a controller electrically coupled to said ground electrode, said power electrode, and said plurality of measurement electrodes, wherein said controller is configured to (i) measure signals indicative of a change in resistance or impedance at said electrode to determine said location of said electrode in said second layer, which location corresponds to a point of contact between said object and said assembly, (ii) measure signals indicative of a change in resistance or impedance at an electrically resistive location disposed between said ground electrode and all of said plurality of measurement electrodes to determine a total force or force distribution applied to said assembly, (iii) generate an output(s) indicative of said point of contact or said total force or force distribution, and (iv) move said conductive core to manipulate said object based at least in part on said location and said total force or force distribution.

2. The system of claim 1, wherein said controller is configured to (i) measure signals indicative of a change in resistance or impedance of said polymeric or polymeric-textile substrate at said electrode of said plurality of measurement electrodes, and (ii) determine said location, subsequent to physical damage or breach of said polymeric or polymeric-textile substrate.

3. The system of claim 1, wherein said second layer comprises a plurality of layers having different material properties.

4. The system of claim 1, wherein said second layer is wrapped around said first layer.

5. The system of claim 1, wherein said second layer has a plurality of faces.

6. The system of claim 5, wherein each face of said plurality of faces of said second layer includes a set of measurement electrodes from said plurality of measurement electrodes.

7. The system of claim 6, wherein said controller is configured to measure signals indicative of a change in resistance with a given set of measurement electrodes included in a face of said plurality of faces to determine a total force or force distribution applied to said face.

8. The system of claim 1, wherein said plurality of measurement electrodes is embedded in said polymeric or polymeric-textile substrate.

9. The system of claim 1, wherein a given electrode of said plurality of measurement electrodes is non-metallic.

10. The system of claim 1, wherein a given electrode of said plurality of measurement electrodes is flexible.

11. The system of claim 1, wherein said polymeric or polymeric-textile substrate comprises a first component volume and a second component volume, wherein said first component volume has a higher conductivity than said second component volume, wherein said second component volume comprises a plurality of conductive pathways.

12. The system of claim 1, wherein said controller is part of said assembly.

13. The system of claim 1, wherein said electrically resistive location comprises a resistor.

14. The system of claim 1, comprising a polymeric-textile substrate, wherein said polymeric-textile substrate comprises a plurality of layers.

15. The system of claim 1, wherein said assembly is an effector.

16. A method for sensing an object, comprising:
(a) activating an assembly comprising (1) a first layer comprising a conductive core and a ground electrode, and (2) a second layer adjacent to said first layer, wherein said second layer comprises a polymeric or polymeric-textile substrate, wherein said polymeric or polymeric-textile substrate includes a power electrode and a plurality of measurement electrodes, and wherein an electrode of said plurality of measurement electrodes is configured to sense changes in electrical resistance or impedance of said polymeric or polymeric-textile substrate at or adjacent to a location of said electrode in said second layer;
(b) measuring signals indicative of a change in resistance or impedance at said electrode to determine said location of said electrode in said second layer, which location corresponds to a point of contact between said object and said assembly;
(c) measuring signals indicative of a change in resistance or impedance at an electrically resistive location disposed between said ground electrode and all of said plurality of measurement electrodes to determine a total force or force distribution applied to said assembly, wherein said point of contact and said total force are registered together in rapid succession; and
(d) generating an output(s) indicative of said point of contact or said total force or force distribution.

17. The method of claim 16, wherein said second layer has a plurality of faces.

18. The method of claim 17, further comprising measuring signals indicative of a change in resistance or impedance with a first set of measurement electrodes included in a first face of said plurality of faces to determine a total force or force distribution applied to said first face.

19. A system for sensing an object, comprising:
an assembly comprising:
(1) a first layer comprising a conductive core and a ground electrode, and
(2) a second layer adjacent to said first layer, wherein said second layer comprises (i) a polymeric or polymer-textile substrate, wherein said polymeric or polymeric-textile substrate includes a power electrode and a plurality of measurement electrodes, and (ii) a plurality of faces, wherein each face of said plurality of faces of said second layer includes a set of measurement electrodes from said plurality of measurement electrodes, and wherein an electrode of said plurality of measurement electrodes is configured to sense changes in electrical resistance or impedance of said polymeric or polymeric-textile substrate at or adjacent to a location of said electrode in said second layer; and a controller electrically coupled to said ground electrode, said power electrode, and said plurality of measurement electrodes, wherein said controller is configured to (i) measure signals indicative of a change in resistance or impedance at said electrode to determine said location of said electrode in said second layer, which location corresponds to a point of contact between said object and said assembly, (ii) measure signals indicative of a change in resistance or impedance at an electrically resistive location disposed between said ground electrode and all of said plurality of measurement electrodes to determine a total force or force distribution applied to said assembly, and (iii) generate an output(s) indicative of said point of contact or said total force or force distribution.

20. A system for sensing an object, comprising:
an assembly comprising:
(1) a first layer comprising a conductive core and a ground electrode, and
(2) a second layer adjacent to said first layer, wherein said second layer comprises a polymeric or polymer-textile substrate, wherein said polymeric or polymeric-textile substrate includes a power electrode and a plurality of measurement electrodes, wherein a given electrode of said plurality of measurement electrodes is non-metallic, and wherein an electrode of said plurality of measurement electrodes is configured to sense changes in electrical resistance or impedance of said polymeric or polymeric-textile substrate at or adjacent to a location of said electrode in said second layer; and
a controller electrically coupled to said ground electrode, said power electrode, and said plurality of measurement electrodes, wherein said controller is configured to (i) measure signals indicative of a change in resistance or impedance at said electrode to determine said location of said electrode in said second layer, which location corresponds to a point of contact between said object and said assembly, (ii) measure signals indicative of a change in resistance or impedance at an electrically resistive location disposed between said ground electrode and all of said plurality of measurement electrodes to determine a total force or force distribution applied to said assembly, and (iii) generate an output(s) indicative of said point of contact or said total force or force distribution.

21. A system for sensing an object, comprising:
an assembly comprising:
(1) a first layer comprising a conductive core and a ground electrode, and
(2) a second layer adjacent to said first layer, wherein said second layer comprises a polymeric or polymer-textile substrate, wherein said polymeric or polymeric-textile substrate comprises (i) a first component volume and a second component volume, wherein said first component volume has a higher conductivity than said second component volume, wherein said second component volume comprises a plurality of conductive pathways, and (ii) a power electrode and a plurality of measurement electrodes, and wherein an electrode of said plurality of measurement electrodes is configured to sense changes in electrical resistance or impedance of said polymeric or polymeric-textile substrate at or adjacent to a location of said electrode in said second layer; and
a controller electrically coupled to said ground electrode, said power electrode, and said plurality of measurement electrodes, wherein said controller is configured to (i) measure signals indicative of a change in resistance or impedance at said electrode to determine said location of said electrode in said second layer, which location corresponds to a point of contact between said object and said assembly, (ii) measure signals indicative of a change in resistance or impedance at an electrically resistive location disposed between said ground electrode and all of said plurality of measurement electrodes to determine a total force or force distribution applied to said assembly, and (iii) generate an output(s) indicative of said point of contact or said total force or force distribution.

22. A system for sensing an object, comprising:
an assembly comprising:
(1) a first layer comprising a conductive core and a ground electrode, and
(2) a second layer adjacent to said first layer, wherein said second layer comprises a polymeric or polymer-textile substrate, wherein said polymeric or polymeric-textile substrate includes (i) a power electrode and a plurality of measurement electrodes, and (ii) a plurality of layers, and wherein an electrode of said plurality of measurement electrodes is configured to sense changes in electrical resistance or impedance of said polymeric or polymeric-textile substrate at or adjacent to a location of said electrode in said second layer; and
a controller electrically coupled to said ground electrode, said power electrode, and said plurality of measurement electrodes, wherein said controller is configured to (i) measure signals indicative of a change in resistance or impedance at said electrode to determine said location of said electrode in said second layer, which location corresponds to a point of contact between said object and said assembly, (ii) measure signals indicative of a change in resistance or impedance at an electrically resistive location disposed between said ground electrode and all of said plurality of measurement electrodes to determine a total force or force distribution applied to said assembly, and (iii) generate an output(s) indicative of said point of contact or said total force or force distribution.

23. A method for sensing an object, comprising:
(a) activating an assembly comprising (1) a first layer comprising a conductive core and a ground electrode, and (2) a second layer adjacent to said first layer, wherein said second layer comprises (i) a polymeric or polymeric-textile substrate and (ii) a plurality of faces, wherein said polymeric or polymeric-textile substrate includes a power electrode and a plurality of measurement electrodes, and wherein an electrode of said plurality of measurement electrodes is configured to sense changes in electrical resistance or impedance of said polymeric or polymeric-textile substrate at or adjacent to a location of said electrode in said second layer;
(b) measuring signals indicative of a change in resistance or impedance at said electrode to determine said location of said electrode in said second layer, which location corresponds to a point of contact between said object and said assembly;
(c) measuring signals indicative of a change in resistance or impedance at an electrically resistive location disposed between said ground electrode and all of said plurality of measurement electrodes to determine a total force or force distribution applied to said assembly; and
(d) measuring signals indicative of a change in resistance or impedance with a first set of measurement electrodes included in a first face of said plurality of faces to determine a total force or force distribution applied to said first face; and
(e) generating an output(s) indicative of said point of contact or said total force or force distribution.

* * * * *